United States Patent
Tsai et al.

(10) Patent No.: US 8,428,177 B2
(45) Date of Patent: Apr. 23, 2013

(54) METHOD AND APPARATUS FOR MULTIPLE INPUT MULTIPLE OUTPUT (MIMO) TRANSMIT BEAMFORMING

(75) Inventors: Jiann-An Tsai, Plano, TX (US); Zhouyue Pi, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 734 days.

(21) Appl. No.: 12/587,708

(22) Filed: Oct. 13, 2009

(65) Prior Publication Data

US 2010/0215112 A1 Aug. 26, 2010

Related U.S. Application Data

(60) Provisional application No. 61/208,518, filed on Feb. 25, 2009, provisional application No. 61/209,145, filed on Mar. 4, 2009.

(51) Int. Cl.
*H04L 27/00* (2006.01)
*H04B 7/02* (2006.01)

(52) U.S. Cl.
USPC ........... 375/295; 375/316; 375/267; 375/299; 370/208; 370/209; 455/101; 455/522

(58) Field of Classification Search .................. 375/219, 375/220, 222, 240.26–240.27, 284–285, 375/295, 296, 316, 221, 259, 299, 260–269, 375/358, 346, 395; 370/319, 208–209, 343–344; 455/69, 67.11, 67.13, 63.1, 101, 522
See application file for complete search history.

(56) References Cited

U.S. PATENT DOCUMENTS

| | | | |
|---|---|---|---|
| 8,121,212 B2 * | 2/2012 | Kwon et al. | 375/267 |
| 2009/0041150 A1 * | 2/2009 | Tsai et al. | 375/267 |
| 2009/0323840 A1 * | 12/2009 | Lee et al. | 375/260 |
| 2010/0111211 A1 * | 5/2010 | Han et al. | 375/260 |
| 2010/0195594 A1 | 8/2010 | Seo et al. | |
| 2012/0039416 A1 * | 2/2012 | Tang et al. | 375/296 |

FOREIGN PATENT DOCUMENTS

| | | | |
|---|---|---|---|
| KR | 1020080070151 A | 7/2008 | |
| KR | 20080086333 A | 9/2008 | |
| KR | 1020080095732 A | 10/2008 | |
| KR | 20090017973 A | 2/2009 | |

* cited by examiner

OTHER PUBLICATIONS

International Search Report dated Oct. 8, 2010 in connection with International Patent Application No. PCT/KR2010/001162.

*Primary Examiner* — Sam K Ahn
*Assistant Examiner* — Linda Wong

(57) ABSTRACT

A wireless communications network is provided. The wireless communications network comprises a plurality of base stations. Each one of said base stations is capable of wireless communications with a plurality of subscriber stations. At least one of said plurality of base stations comprises a processor configured to select a codeword from a codebook and precode data with the selected codeword, and a transmitter configured to transmit the precoded data. Rank 1 of the codebook is selected from the following algorithm:

| Codebook Matrix Index (CMI) | Base Matrix | Rank 1 |
|---|---|---|
| 1 | V8(:, :, 3) | V8(:, 1, 3) |
| 2 | | V8(:, 2, 3) |
| 3 | | V8(:, 3, 3) |
| 4 | | V8(:, 4, 3) |
| 5 | | V8(:, 5, 3) |
| 6 | | V8(:, 6, 3) |
| 7 | | V8(:, 7, 3) |
| 8 | | V8(:, 8, 3) |
| 9 | | V8(:, 9, 3) |

| Codebook Matrix Index (CMI) | Base Matrix | Rank 1 |
|---|---|---|
| 10 | | V8(:, 10, 3) |
| 11 | | V8(:, 11, 3) |
| 12 | | V8(:, 12, 3) |
| 13 | | V8(:, 13, 3) |
| 14 | | V8(:, 14, 3) |
| 15 | | V8(:, 15, 3) |
| 16 | | V8(:, 16, 3). |

23 Claims, 14 Drawing Sheets

| CODEBOOK MATRIX INDEX (CMI) | BASE MATRIX | RANK1 | BASE MATRIX | RANK2 | RANK3 | RANK4 | RANK5 | RANK6 | RANK7 | RANK8 |
|---|---|---|---|---|---|---|---|---|---|---|
| 1 | V8(:,:,3) | V8(:,1,3) | V8(:,:,1) | 1 5 | 1 3 5 | 1537 | 12357 | 123567 | 1234567 | 12345678 |
| 2 | | V8(:,2,3) | | 2 6 | 2 4 6 | 2648 | 12468 | 124568 | 1234568 | N/A |
| 3 | | V8(:,3,3) | | 3 7 | 2 3 7 | 3726 | 23467 | 234678 | 1234678 | N/A |
| 4 | | V8(:,4,3) | | 4 8 | 1 4 8 | 4815 | 13458 | 134578 | 1234578 | N/A |
| 5 | | V8(:,5,3) | | 5 3 | 3 5 7 | 5372 | 23567 | 234567 | 2345678 | N/A |
| 6 | | V8(:,6,3) | | 4 6 | 4 6 8 | 6481 | 14568 | 134568 | 1345678 | N/A |
| 7 | | V8(:,7,3) | | 2 7 | 2 6 7 | 7264 | 24678 | 124678 | 1245678 | N/A |
| 8 | | V8(:,8,3) | | 8 1 | 1 5 8 | 8153 | 13578 | 123578 | 1235678 | 12345678 |
| 9 | | V8(:,9,3) | V8(:,:,2) | 1 3 | 1 2 3 | 1234 | 12345 | 123456 | 1234567 | N/A |
| 10 | | V8(:,10,3) | | 2 4 | 1 2 4 | 1246 | 12456 | 124567 | 1245678 | N/A |
| 11 | | V8(:,11,3) | | 2 3 | 2 3 4 | 2437 | 23478 | 123478 | 1234578 | N/A |
| 12 | | V8(:,12,3) | | 1 4 | 1 3 4 | 1348 | 13478 | 134678 | 1234678 | N/A |
| 13 | | V8(:,13,3) | | 5 8 | 5 7 8 | 3578 | 23578 | 235678 | 1235678 | N/A |
| 14 | | V8(:,14,3) | | 6 7 | 6 7 8 | 4678 | 14678 | 145678 | 1345678 | N/A |
| 15 | | V8(:,15,3) | | 5 7 | 5 7 6 | 5678 | 35678 | 345678 | 2345678 | N/A |
| 16 | | V8(:,16,3) | | 6 8 | 5 6 8 | 1568 | 13568 | 123568 | 1234568 | N/A |

FIG. 10A

| CODEBOOK MATRIX INDEX | V8(:,CMI,3) = [c1, c2, ... c8]; | | | | | | | |
|---|---|---|---|---|---|---|---|---|
| | c1 | c2 | c3 | c4 | c5 | c6 | c7 | c8 |
| 1 | 0.3536 | -0.3051 - 0.1786i | 0.1732 + 0.3082i | 0.0062 - 0.3535i | -0.1839 + 0.3020i | 0.3112 - 0.1677i | -0.3533 - 0.0124i | 0.2987 + 0.1892i |
| 2 | 0.3536 | -0.2514 - 0.2486i | 0.0041 + 0.3535i | 0.2456 - 0.2543i | -0.3535 + 0.0082i | 0.2571 + 0.2427i | -0.0123 - 0.3533i | -0.2397 + 0.2599i |
| 3 | 0.3536 | -0.1697 - 0.3102i | -0.1907 + 0.2977i | 0.3527 + 0.0244i | -0.1479 - 0.3211i | -0.2107 + 0.2839i | 0.3502 + 0.0486i | -0.1254 - 0.3306i |
| 4 | 0.3536 | -0.0614 - 0.3482i | -0.3322 + 0.1210i | 0.1768 + 0.3062i | 0.2708 - 0.2273i | -0.2709 - 0.2272i | -0.1767 + 0.3062i | 0.3323 + 0.1208i |
| 5 | 0.3536 | 0.0638 - 0.3478i | -0.3306 - 0.1254i | -0.1830 + 0.3025i | 0.2646 + 0.2345i | 0.2784 - 0.2180i | -0.1642 - 0.3131i | -0.3376 + 0.1050i |
| 6 | 0.3536 | 0.1881 - 0.2994i | -0.1534 - 0.3185i | -0.3513 - 0.0395i | -0.2204 + 0.2764i | 0.1168 + 0.3337i | 0.3447 + 0.0786i | 0.2499 - 0.2501i |
| 7 | 0.3536 | 0.2892 - 0.2034i | 0.1196 - 0.3327i | -0.0936 - 0.3409i | -0.2727 - 0.2251i | -0.3525 - 0.0272i | -0.3040 + 0.1805i | -0.1449 + 0.3225i |
| 8 | 0.3536 | 0.3461 - 0.0721i | 0.3241 - 0.1412i | 0.2885 - 0.2044i | 0.2407 - 0.2590i | 0.1828 - 0.3026i | 0.1172 - 0.3336i | 0.0467 - 0.3505i |
| 9 | 0.3536 | 0.3461 + 0.0721i | 0.3241 + 0.1412i | 0.2885 + 0.2044i | 0.2407 + 0.2590i | 0.1828 + 0.3026i | 0.1172 + 0.3336i | 0.0467 - 0.3505i |
| 10 | 0.3536 | 0.2892 + 0.2034i | 0.1196 + 0.3327i | -0.0936 + 0.3409i | -0.2727 + 0.2251i | -0.3525 + 0.0272i | -0.3040 - 0.1805i | -0.1449 - 0.3225i |
| 11 | 0.3536 | 0.1881 + 0.2994i | -0.1534 + 0.3185i | -0.3513 + 0.0395i | -0.2204 - 0.2764i | 0.1168 - 0.3337i | 0.3447 - 0.0786i | 0.2499 + 0.2501i |
| 12 | 0.3536 | 0.0638 + 0.3478i | -0.3306 + 0.1254i | -0.1830 - 0.3025i | 0.2646 - 0.2345i | 0.2784 + 0.2180i | -0.1642 + 0.3131i | -0.3376 - 0.1050i |
| 13 | 0.3536 | -0.0614 + 0.3482i | -0.3322 - 0.1210i | 0.1768 - 0.3062i | 0.2708 + 0.2273i | -0.2709 + 0.2272i | -0.1767 - 0.3062i | 0.3323 - 0.1208i |
| 14 | 0.3536 | -0.1697 + 0.3102i | -0.1907 - 0.2977i | 0.3527 - 0.0244i | -0.1479 + 0.3211i | -0.2107 - 0.2839i | 0.3502 - 0.0486i | -0.1254 + 0.3306i |
| 15 | 0.3536 | -0.2514 + 0.2486i | 0.0041 - 0.3535i | 0.2456 + 0.2543i | -0.3535 - 0.0082i | 0.2571 - 0.2427i | -0.0123 + 0.3533i | -0.2397 - 0.2599i |
| 16 | 0.3536 | -0.3051 + 0.1786i | 0.1732 - 0.3082i | 0.0062 + 0.3535i | -0.1839 - 0.3020i | 0.3112 + 0.1677i | -0.3533 + 0.0124i | 0.2987 - 0.1892i |

FIG. 10B $$V8(:,:,1) = \frac{1}{\sqrt{8}} H_{1,1,3}(1,3,2,4) = \frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & \frac{(-1+j)}{\sqrt{2}} \\ 1 & 1 & -1 & -1 & j & j & -j & -j \\ 1 & -1 & -j & j & \frac{(-1+j)}{\sqrt{2}} & -\frac{(-1+j)}{\sqrt{2}} & \frac{(1+j)}{\sqrt{2}} & -\frac{(1+j)}{\sqrt{2}} \\ 1 & 1 & 1 & 1 & -1 & -1 & -1 & -1 \\ 1 & -1 & j & -j & -\frac{(1+j)}{\sqrt{2}} & \frac{(1+j)}{\sqrt{2}} & -\frac{(-1+j)}{\sqrt{2}} & \frac{(-1+j)}{\sqrt{2}} \\ 1 & 1 & -1 & -1 & -j & -j & j & j \\ 1 & -1 & -j & j & -\frac{(-1+j)}{\sqrt{2}} & \frac{(-1+j)}{\sqrt{2}} & -\frac{(1+j)}{\sqrt{2}} & \frac{(1+j)}{\sqrt{2}} \end{bmatrix}$$

1110

$$V8(:,:,2) = \frac{1}{\sqrt{8}} H_{3,2,4}(1,3,2,4) = \frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & \frac{(-1+j)}{\sqrt{2}} \\ \frac{(1+j)}{\sqrt{2}} & \frac{(1+j)}{\sqrt{2}} & \frac{(1+j)}{\sqrt{2}} & \frac{(1+j)}{\sqrt{2}} & \frac{(-1+j)}{\sqrt{2}} & \frac{(-1+j)}{\sqrt{2}} & \frac{(-1+j)}{\sqrt{2}} & \frac{(-1+j)}{\sqrt{2}} \\ \frac{(1+j)}{\sqrt{2}} & -\frac{(1+j)}{\sqrt{2}} & \frac{(-1+j)}{\sqrt{2}} & \frac{(-1+j)}{\sqrt{2}} & -1 & 1 & j & -j \\ j & j & j & j & -j & -j & -j & -j \\ j & -j & -1 & 1 & -\frac{(-1+j)}{\sqrt{2}} & \frac{(-1+j)}{\sqrt{2}} & \frac{(1+j)}{\sqrt{2}} & \frac{(1+j)}{\sqrt{2}} \\ \frac{(-1+j)}{\sqrt{2}} & \frac{(-1+j)}{\sqrt{2}} & \frac{(-1+j)}{\sqrt{2}} & \frac{(-1+j)}{\sqrt{2}} & \frac{(1+j)}{\sqrt{2}} & \frac{(1+j)}{\sqrt{2}} & \frac{(1+j)}{\sqrt{2}} & \frac{(1+j)}{\sqrt{2}} \\ \frac{(-1+j)}{\sqrt{2}} & -\frac{(-1+j)}{\sqrt{2}} & \frac{(1+j)}{\sqrt{2}} & \frac{(1+j)}{\sqrt{2}} & j & -j & 1 & -1 \end{bmatrix}$$

| BASE MATRIX | CODEWORD INDEX | RANK1 | RANK2 | RANK3 | RANK4 | RANK5 | RANK6 | RANK7 | RANK8 |
|---|---|---|---|---|---|---|---|---|---|
| V8(:,:,4) | 1 | 1 | N/A | N/A | N/A | N/A | N/A | N/A | N/A |
| | 2 | 2 | N/A | N/A | N/A | N/A | N/A | N/A | N/A |
| | 3 | 3 | N/A | N/A | N/A | N/A | N/A | N/A | N/A |
| | 4 | 4 | N/A | N/A | N/A | N/A | N/A | N/A | N/A |
| | 5 | 5 | N/A | N/A | N/A | N/A | N/A | N/A | N/A |
| | 6 | 6 | N/A | N/A | N/A | N/A | N/A | N/A | N/A |
| | 7 | 7 | N/A | N/A | N/A | N/A | N/A | N/A | N/A |
| | 8 | 8 | N/A | N/A | N/A | N/A | N/A | N/A | N/A |
| V8(:,:,2) | 9 | N/A | 1 3 | 1 2 3 | 1234 | 12345 | 123456 | 1234567 | 12345678 |
| | 10 | N/A | 2 4 | 1 2 4 | 1246 | 12456 | 124567 | 1245678 | N/A |
| | 11 | N/A | 2 3 | 2 3 4 | 2437 | 23478 | 123478 | 1234578 | N/A |
| | 12 | N/A | 1 4 | 1 3 4 | 1348 | 13478 | 134678 | 1234678 | N/A |
| | 13 | N/A | 5 8 | 5 7 8 | 3578 | 23578 | 235678 | 1235678 | N/A |
| | 14 | N/A | 6 7 | 6 7 8 | 4678 | 14678 | 145678 | 1345678 | N/A |
| | 15 | N/A | 5 7 | 5 7 6 | 5678 | 35678 | 345678 | 2345678 | N/A |
| | 16 | N/A | 6 8 | 5 6 8 | 1568 | 13568 | 123568 | 1234568 | N/A |

FIG. 12

| BASE MATRIX | CODEWORD INDEX | RANK1 | RANK2 | RANK3 | RANK4 | RANK5 | RANK6 | RANK7 | RANK8 |
|---|---|---|---|---|---|---|---|---|---|
| V8(:,:,4) | 1 | 1 | N/A | N/A | N/A | N/A | N/A | N/A | N/A |
| | 2 | 2 | N/A | N/A | N/A | N/A | N/A | N/A | N/A |
| | 3 | 3 | N/A | N/A | N/A | N/A | N/A | N/A | N/A |
| | 4 | 4 | N/A | N/A | N/A | N/A | N/A | N/A | N/A |
| | 5 | 5 | N/A | N/A | N/A | N/A | N/A | N/A | N/A |
| | 6 | 6 | N/A | N/A | N/A | N/A | N/A | N/A | N/A |
| | 7 | 7 | N/A | N/A | N/A | N/A | N/A | N/A | N/A |
| | 8 | 8 | N/A | N/A | N/A | N/A | N/A | N/A | N/A |
| V8(:,:,1) | 9 | N/A | 1 5 | 1 3 5 | 1537 | 12357 | 123567 | 1234567 | 12345678 |
| | 10 | N/A | 2 6 | 2 4 6 | 2648 | 12468 | 124568 | 1234568 | N/A |
| | 11 | N/A | 3 7 | 2 3 7 | 3726 | 23467 | 234678 | 1234678 | N/A |
| | 12 | N/A | 4 8 | 1 4 8 | 4815 | 13458 | 134578 | 1234578 | N/A |
| | 13 | N/A | 5 3 | 3 5 7 | 5372 | 23567 | 234567 | 2345678 | N/A |
| | 14 | N/A | 4 6 | 4 6 8 | 6481 | 14568 | 134568 | 1345678 | N/A |
| | 15 | N/A | 2 7 | 2 6 7 | 7264 | 24678 | 124678 | 1245678 | N/A |
| | 16 | N/A | 8 1 | 1 5 8 | 8153 | 13578 | 123578 | 1235678 | N/A |

| BASE MATRIX | CODEWORD INDEX | RANK1 | RANK2 | RANK3 | RANK4 | RANK5 | RANK6 | RANK7 | RANK8 |
|---|---|---|---|---|---|---|---|---|---|
| V8(:,:,5) | 1 | 1 | N/A | N/A | N/A | N/A | N/A | N/A | N/A |
| | 2 | 2 | N/A | N/A | N/A | N/A | N/A | N/A | N/A |
| | 3 | 3 | N/A | N/A | N/A | N/A | N/A | N/A | N/A |
| | 4 | 4 | N/A | N/A | N/A | N/A | N/A | N/A | N/A |
| | 5 | 5 | N/A | N/A | N/A | N/A | N/A | N/A | N/A |
| | 6 | 6 | N/A | N/A | N/A | N/A | N/A | N/A | N/A |
| | 7 | 7 | N/A | N/A | N/A | N/A | N/A | N/A | N/A |
| | 8 | 8 | N/A | N/A | N/A | N/A | N/A | N/A | N/A |
| V8(:,:,2) OR V8(:,:,1) | 9 | N/A | 1 5 | 1 3 5 | 1537 | 12357 | 123567 | 1234567 | 12345678 |
| | 10 | N/A | 2 6 | 2 4 6 | 2648 | 12468 | 124568 | 1234568 | N/A |
| | 11 | N/A | 3 7 | 2 3 7 | 3726 | 23467 | 234678 | 1234678 | N/A |
| | 12 | N/A | 4 8 | 1 4 8 | 4815 | 13458 | 134578 | 1234578 | N/A |
| | 13 | N/A | 5 3 | 3 5 7 | 5372 | 23567 | 234567 | 2345678 | N/A |
| | 14 | N/A | 4 6 | 4 6 8 | 6481 | 14568 | 134568 | 1345678 | N/A |
| | 15 | N/A | 2 7 | 2 6 7 | 7264 | 24678 | 124678 | 1245678 | N/A |
| | 16 | N/A | 8 1 | 1 5 8 | 8153 | 13578 | 123578 | 1235678 | N/A |

FIG. 14

| BASE MATRIX | CODEWORD INDEX | RANK1 | RANK2 | RANK3 | RANK4 | RANK5 | RANK6 | RANK7 | RANK8 |
|---|---|---|---|---|---|---|---|---|---|
| $W_1 = \frac{1}{\sqrt{8}} H_{1,1,1}^{(1,1,1,1)}$ | 1 | 1 | 1 5 | 1 3 5 | 1357 | 12357 | 123567 | 1234567 | 12345678 |
| | 2 | 2 | 2 4 | 1 2 4 | 1247 | 12478 | 124578 | 1245678 | N/A |
| | 3 | 3 | 1 3 | 1 2 3 | 1234 | 12345 | 123457 | 1234578 | N/A |
| | 4 | 4 | 4 8 | 1 4 8 | 1458 | 14568 | 124568 | 1234568 | N/A |
| | 5 | 5 | 5 7 | 5 6 7 | 5678 | 15678 | 135678 | 1235678 | N/A |
| | 6 | 6 | 2 6 | 2 4 6 | 2468 | 24678 | 124678 | 1234678 | N/A |
| | 7 | 7 | 3 7 | 2 3 7 | 2367 | 23467 | 234678 | 2345678 | N/A |
| | 8 | 8 | 6 8 | 5 6 8 | 3568 | 34568 | 134568 | 1345678 | N/A |
| $W_2 = \frac{1}{\sqrt{8}} H_{3,3,3}^{(3,3,3,3)}$ | 9 | 1 | 1 3 | 1 3 5 | 1357 | 12357 | 123567 | 1234567 | 12345678 |
| | 10 | 2 | 2 4 | 2 4 6 | 2468 | 23468 | 234678 | 2345678 | N/A |
| | 11 | 3 | 3 5 | 3 5 7 | 3457 | 34567 | 134567 | 1345678 | N/A |
| | 12 | 4 | 4 6 | 4 6 8 | 4678 | 14678 | 124678 | 1234678 | N/A |
| | 13 | 5 | 5 7 | 1 5 7 | 1257 | 12567 | 124567 | 1245678 | N/A |
| | 14 | 6 | 6 8 | 2 6 8 | 2678 | 23678 | 123678 | 1235678 | N/A |
| | 15 | 7 | 1 7 | 1 3 7 | 1237 | 12378 | 123578 | 1234578 | N/A |
| | 16 | 8 | 2 8 | 2 4 8 | 2348 | 23458 | 234568 | 1234568 | N/A |

FIG. 15

METHOD AND APPARATUS FOR MULTIPLE INPUT MULTIPLE OUTPUT (MIMO) TRANSMIT BEAMFORMING

CROSS-REFERENCE TO RELATED APPLICATION(S) AND CLAIM OF PRIORITY

The present application is related to U.S. Provisional Patent No. 61/208,518, filed Feb. 25, 2009, entitled "METHOD AND APPARATUS FOR MULTI-USER CLOSED-LOOP TRANSMIT BEAMFORMING (MU-CLTB) WITH 8 TRANSMIT ANTENNA IN OFDM WIRELESS SYSTEMS". Provisional Patent No. 61/208,518 is assigned to the assignee of the present application and is hereby incorporated by reference into the present application as if fully set forth herein. The present application hereby claims priority under 35 U.S.C. §119(e) to U.S. Provisional Patent No. 61/208,518.

The present application also is related to U.S. Provisional Patent No. 61/209,145, filed Mar. 4, 2009, entitled "METHOD AND APPARATUS FOR MULTI-USER CLOSED-LOOP TRANSMIT BEAMFORMING (MU-CLTB) WITH 8 TRANSMIT ANTENNA IN OFDM WIRELESS SYSTEMS". Provisional Patent No. 61/209,145 is assigned to the assignee of the present application and is hereby incorporated by reference into the present application as if fully set forth herein. The present application hereby claims priority under 35 U.S.C. §119(e) to U.S. Provisional Patent No. 61/209,145.

TECHNICAL FIELD OF THE INVENTION

The present application relates generally to wireless communication systems and, more specifically, to beamforming in wireless communication systems.

BACKGROUND OF THE INVENTION

Transmit beamforming in wireless systems can be performed in either a closed-loop or an open-loop manner. An open-loop system is well suited for Time Division Duplexing (TDD) systems. An open-loop system does not require channel information feedback. As a result, less overhead is required. However, the disadvantage of an open-loop system is that the system needs to constantly conduct phase calibration in order to compensate for the phase difference between the transmission and reception Radio Frequency (RF) chains among the multiple transmit antennas. Another disadvantage of an open-loop system is that the system requires a constant uplink phase reference such as uplink pilots. This requirement could lead to an excessive feedback overhead. The process of phase calibration is generally costly and sensitive to radio channel environment.

A closed-loop system, on the other hand, does not require phase calibration process. However, a closed-loop system does require channel feedback to the transmitter, which results in additional overhead. Furthermore, a closed-loop system is also sensitive to feedback channel error due to feedback delay or fast channel variation. Typically, Frequency Division Duplexing (FDD) systems employ closed-loop transmit beamforming schemes. However, a closed-loop scheme also can be applied to TDD systems.

SUMMARY OF THE INVENTION

A wireless communications network is provided. The wireless communications network comprises a plurality of base stations. Each one of said base stations is capable of wireless communications with a plurality of subscriber stations. At least one of said plurality of base stations comprises a processor configured to select a codeword from a codebook and precode data with the selected codeword, and a transmitter configured to transmit the precoded data. Rank 1 of the codebook is selected from the following algorithm:

| Codebook Matrix Index (CMI) | Base Matrix | Rank 1 |
|---|---|---|
| 1 | V8(:, :, 3) | V8(:, 1, 3) |
| 2 | | V8(:, 2, 3) |
| 3 | | V8(:, 3, 3) |
| 4 | | V8(:, 4, 3) |
| 5 | | V8(:, 5, 3) |
| 6 | | V8(:, 6, 3) |
| 7 | | V8(:, 7, 3) |
| 8 | | V8(:, 8, 3) |
| 9 | | V8(:, 9, 3) |
| 10 | | V8(:, 10, 3) |
| 11 | | V8(:, 11, 3) |
| 12 | | V8(:, 12, 3) |
| 13 | | V8(:, 13, 3) |
| 14 | | V8(:, 14, 3) |
| 15 | | V8(:, 15, 3) |
| 16 | | V8(:, 16, 3) |

A wireless communications network is provided. The wireless communications network comprises a plurality of base stations. Each one of said base stations is capable of wireless communications with a plurality of subscriber stations. At least one of said plurality of base stations comprises a processor configured to select a codeword from a codebook and precode data with the selected codeword, and a transmitter configured to transmit the precoded data. Ranks 3 to 8 of the codebook are selected from the following algorithms:

| Codebook Matrix Index (CMI) | Base Matrix | Rank3 | Rank4 | Rank5 | Rank6 | Rank7 | Rank8 |
|---|---|---|---|---|---|---|---|
| 1 | V8(:, :, 1) | 135 | 1537 | 12357 | 123567 | 1234567 | 12345678 |
| 2 | | 246 | 2648 | 12468 | 124568 | 1234568 | n/a |
| 3 | | 237 | 3726 | 23467 | 234678 | 1234678 | n/a |
| 4 | | 148 | 4815 | 13458 | 134578 | 1234578 | n/a |
| 5 | | 357 | 5372 | 23567 | 234567 | 2345678 | n/a |
| 6 | | 468 | 6481 | 14568 | 134568 | 1345678 | n/a |
| 7 | | 267 | 7264 | 24678 | 124678 | 1245678 | n/a |
| 8 | | 158 | 8153 | 13578 | 123578 | 1235678 | n/a |
| 9 | V8(:, :, 2) | 123 | 1234 | 12345 | 123456 | 1234567 | 12345678 |
| 10 | | 124 | 1246 | 12456 | 124567 | 1245678 | n/a |
| 11 | | 234 | 2437 | 23478 | 123478 | 1234578 | n/a |
| 12 | | 134 | 1348 | 13478 | 134678 | 1234678 | n/a |

-continued

| Codebook Matrix Index (CMI) | Base Matrix | Rank3 | Rank4 | Rank5 | Rank6 | Rank7 | Rank8 |
|---|---|---|---|---|---|---|---|
| 13 | | 578 | 3578 | 23578 | 235678 | 1235678 | n/a |
| 14 | | 678 | 4678 | 14678 | 145678 | 1345678 | n/a |
| 15 | | 576 | 5678 | 35678 | 345678 | 2345678 | n/a |
| 16 | | 568 | 1568 | 13568 | 123568 | 1234568 | n/a | where the numbers shown in the column for each rank refer to the column index of the matrices V8(:,:,1) and V8(:,:,2).

A wireless communications network is provided. The wireless communications network comprises a plurality of base stations. Each one of said base stations is capable of wireless communications with a plurality of subscriber stations. At least one of said plurality of base stations comprises a processor configured to select a codeword from a codebook and precode data with the selected codeword, and a transmitter configured to transmit the precoded data. Ranks 1 to 8 of the codebook are selected from the following algorithm:

| Base Matrix | CW Index | Rank1 | Rank2 | Rank3 | Rank4 | Rank5 | Rank6 | Rank7 | Rank8 |
|---|---|---|---|---|---|---|---|---|---|
| $W_1 = \frac{1}{\sqrt{8}} H_{1,1,1}(1, 1, 1, 1)$ | 1 | 1 | 15 | 135 | 1357 | 12357 | 123567 | 1234567 | 12345678 |
| | 2 | 2 | 24 | 124 | 1247 | 12478 | 124578 | 1245678 | n/a |
| | 3 | 3 | 13 | 123 | 1234 | 12345 | 123457 | 1234578 | n/a |
| | 4 | 4 | 48 | 148 | 1458 | 14568 | 124568 | 1234568 | n/a |
| | 5 | 5 | 57 | 567 | 5678 | 15678 | 135678 | 1235678 | n/a |
| | 6 | 6 | 26 | 246 | 2468 | 24678 | 124678 | 1234678 | n/a |
| | 7 | 7 | 37 | 237 | 2367 | 23467 | 234678 | 2345678 | n/a |
| | 8 | 8 | 68 | 568 | 3568 | 34568 | 134568 | 1345678 | n/a |
| $W_2 = \frac{1}{\sqrt{8}} H_{3,3,3}(3, 3, 3, 3)$ | 9 | 1 | 13 | 135 | 1357 | 12357 | 123567 | 1234567 | 12345678 |
| | 10 | 2 | 24 | 246 | 2468 | 23468 | 234678 | 2345678 | n/a |
| | 11 | 3 | 35 | 357 | 3457 | 34567 | 134567 | 1345678 | n/a |
| | 12 | 4 | 46 | 468 | 4678 | 14678 | 124678 | 1234678 | n/a |
| | 13 | 5 | 57 | 157 | 1257 | 12567 | 124567 | 1245678 | n/a |
| | 14 | 6 | 68 | 268 | 2678 | 23678 | 123678 | 1235678 | n/a |
| | 15 | 7 | 17 | 137 | 1237 | 12378 | 123578 | 1234578 | n/a |
| | 16 | 8 | 28 | 248 | 2348 | 23458 | 234568 | 1234568 | n/a | where the numbers shown in the column for each rank refer to the column index of the matrices $$W_1 = \frac{1}{\sqrt{8}} H_{1,1,1}(1, 1, 1, 1) \text{ and } W_2 = \frac{1}{\sqrt{8}} H_{3,3,3}(3, 3, 3, 3).$$

A base station is provided. The base station comprises a processor configured to select a codeword from a codebook and precode data with the selected codeword, and a transmitter configured to transmit the precoded data. Rank 1 of the codebook is selected from the following algorithm:

| Codebook Matrix Index (CMI) | Base Matrix | Rank 1 |
|---|---|---|
| 1 | V8(:, :, 3) | V8(:, 1, 3) |
| 2 | | V8(:, 2, 3) |
| 3 | | V8(:, 3, 3) |
| 4 | | V8(:, 4, 3) |

-continued

| Codebook Matrix Index (CMI) | Base Matrix | Rank 1 |
|---|---|---|
| 5 | | V8(:, 5, 3) |
| 6 | | V8(:, 6, 3) |
| 7 | | V8(:, 7, 3) |
| 8 | | V8(:, 8, 3) |
| 9 | | V8(:, 9, 3) |
| 10 | | V8(:, 10, 3) |
| 11 | | V8(:, 11, 3) |
| 12 | | V8(:, 12, 3) |
| 13 | | V8(:, 13, 3) |
| 14 | | V8(:, 14, 3) |
| 15 | | V8(:, 15, 3) |
| 16 | | V8(:, 16, 3) |

A base station is provided. The base station comprises a processor configured to select a codeword from a codebook and precode data with the selected codeword, and a transmitter configured to transmit the precoded data. Ranks 1 to 8 of the codebook are selected from the following algorithms:

| Codebook Matrix Index (CMI) | Base Matrix | Rank3 | Rank4 | Rank5 | Rank6 | Rank7 | Rank8 |
|---|---|---|---|---|---|---|---|
| 1 | V8(:,:,1) | 135 | 1537 | 12357 | 123567 | 1234567 | 12345678 |
| 2 | | 246 | 2648 | 12468 | 124568 | 1234568 | n/a |
| 3 | | 237 | 3726 | 23467 | 234678 | 1234678 | n/a |
| 4 | | 148 | 4815 | 13458 | 134578 | 1234578 | n/a |
| 5 | | 357 | 5372 | 23567 | 234567 | 2345678 | n/a |
| 6 | | 468 | 6481 | 14568 | 134568 | 1345678 | n/a |
| 7 | | 267 | 7264 | 24678 | 124678 | 1245678 | n/a |
| 8 | | 158 | 8153 | 13578 | 123578 | 1235678 | n/a |
| 9 | V8(:,:,2) | 123 | 1234 | 12345 | 123456 | 1234567 | 12345678 |
| 10 | | 124 | 1246 | 12456 | 124567 | 1245678 | n/a |
| 11 | | 234 | 2437 | 23478 | 123478 | 1234578 | n/a |
| 12 | | 134 | 1348 | 13478 | 134678 | 1234678 | n/a |
| 13 | | 578 | 3578 | 23578 | 235678 | 1235678 | n/a |
| 14 | | 678 | 4678 | 14678 | 145678 | 1345678 | n/a |
| 15 | | 576 | 5678 | 35678 | 345678 | 2345678 | n/a |
| 16 | | 568 | 1568 | 13568 | 123568 | 1234568 | n/a | where the numbers shown in the column for each rank refer to the column index of the matrices V8(:,:,1) and V8(:,:,2).

A base station is provided. The base station comprises a processor configured to select a codeword from a codebook and precode data with the selected codeword, and a transmitter configured to transmit the precoded data. Ranks 1 to 8 of the codebook are selected from the following algorithm:

| Base Matrix | CW Index | Rank1 | Rank2 | Rank3 | Rank4 | Rank5 | Rank6 | Rank7 | Rank8 |
|---|---|---|---|---|---|---|---|---|---|
| $W_1 = \frac{1}{\sqrt{8}} H_{1,1,1}(1, 1, 1, 1)$ | 1 | 1 | 15 | 135 | 1357 | 12357 | 123567 | 1234567 | 12345678 |
| | 2 | 2 | 24 | 124 | 1247 | 12478 | 124578 | 1245678 | n/a |
| | 3 | 3 | 13 | 123 | 1234 | 12345 | 123457 | 1234578 | n/a |
| | 4 | 4 | 48 | 148 | 1458 | 14568 | 124568 | 1234568 | n/a |
| | 5 | 5 | 57 | 567 | 5678 | 15678 | 135678 | 1235678 | n/a |
| | 6 | 6 | 26 | 246 | 2468 | 24678 | 124678 | 1234678 | n/a |
| | 7 | 7 | 37 | 237 | 2367 | 23467 | 234678 | 2345678 | n/a |
| | 8 | 8 | 68 | 568 | 3568 | 34568 | 134568 | 1345678 | n/a |
| $W_2 = \frac{1}{\sqrt{8}} H_{3,3,3}(3, 3, 3, 3)$ | 9 | 1 | 13 | 135 | 1357 | 12357 | 123567 | 1234567 | 12345678 |
| | 10 | 2 | 24 | 246 | 2468 | 23468 | 234678 | 2345678 | n/a |
| | 11 | 3 | 35 | 357 | 3457 | 34567 | 134567 | 1345678 | n/a |
| | 12 | 4 | 46 | 468 | 4678 | 14678 | 124678 | 1234678 | n/a |
| | 13 | 5 | 57 | 157 | 1257 | 12567 | 124567 | 1245678 | n/a |
| | 14 | 6 | 68 | 268 | 2678 | 23678 | 123678 | 1235678 | n/a |
| | 15 | 7 | 17 | 137 | 1237 | 12378 | 123578 | 1234578 | n/a |
| | 16 | 8 | 28 | 248 | 2348 | 23458 | 234568 | 1234568 | n/a | where the numbers shown in the column for each rank refer to the column index of the matrices $$W_1 = \frac{1}{\sqrt{8}} H_{1,1,1}(1, 1, 1, 1) \text{ and } W_2 = \frac{1}{\sqrt{8}} H_{3,3,3}(3, 3, 3, 3).$$

A method of operating a base station is provided. The method comprises selecting a codeword from a codebook, precoding data with the selected codeword; and transmitting the precoded data. Rank 1 of the codebook is selected from the following algorithm:

| Codebook Matrix Index (CMI) | Base Matrix | Rank 1 |
|---|---|---|
| 1 | V8(:,:,3) | V8(:,1,3) |
| 2 | | V8(:,2,3) |
| 3 | | V8(:,3,3) |
| 4 | | V8(:,4,3) |
| 5 | | V8(:,5,3) |
| 6 | | V8(:,6,3) |
| 7 | | V8(:,7,3) |
| 8 | | V8(:,8,3) |
| 9 | | V8(:,9,3) |
| 10 | | V8(:,10,3) |
| 11 | | V8(:,11,3) |
| 12 | | V8(:,12,3) |
| 13 | | V8(:,13,3) |
| 14 | | V8(:,14,3) |
| 15 | | V8(:,15,3) |
| 16 | | V8(:,16,3) |

A method of operating a base station is provided. The method comprises selecting a codeword from a codebook, precoding data with the selected codeword; and transmitting the precoded data. Ranks 3 to 8 of the codebook are selected from the following algorithms:

| Codebook Matrix Index (CMI) | Base Matrix | Rank3 | Rank4 | Rank5 | Rank6 | Rank7 | Rank8 |
|---|---|---|---|---|---|---|---|
| 1 | V8(:,:,1) | 135 | 1537 | 12357 | 123567 | 1234567 | 12345678 |
| 2 | | 246 | 2648 | 12468 | 124568 | 1234568 | n/a |
| 3 | | 237 | 3726 | 23467 | 234678 | 1234678 | n/a |
| 4 | | 148 | 4815 | 13458 | 134578 | 1234578 | n/a |
| 5 | | 357 | 5372 | 23567 | 234567 | 2345678 | n/a |
| 6 | | 468 | 6481 | 14568 | 134568 | 1345678 | n/a |
| 7 | | 267 | 7264 | 24678 | 124678 | 1245678 | n/a |
| 8 | | 158 | 8153 | 13578 | 123578 | 1235678 | n/a |
| 9 | V8(:,:,2) | 123 | 1234 | 12345 | 123456 | 1234567 | 12345678 |
| 10 | | 124 | 1246 | 12456 | 124567 | 1245678 | n/a |
| 11 | | 234 | 2437 | 23478 | 123478 | 1234578 | n/a |
| 12 | | 134 | 1348 | 13478 | 134678 | 1234678 | n/a |
| 13 | | 578 | 3578 | 23578 | 235678 | 1235678 | n/a |
| 14 | | 678 | 4678 | 14678 | 145678 | 1345678 | n/a |
| 15 | | 576 | 5678 | 35678 | 345678 | 2345678 | n/a |
| 16 | | 568 | 1568 | 13568 | 123568 | 1234568 | n/a | where the numbers shown in the column for each rank refer to the column index of the matrices V8(:,:,1) and V8(:,:,2).

A method of operating a base station is provided. The method comprises selecting a codeword from a codebook, precoding data with the selected codeword; and transmitting the precoded data. Ranks 1 to 8 of the codebook are selected from the following algorithm:

| Base Matrix | CW Index | Rank1 | Rank2 | Rank3 | Rank4 | Rank5 | Rank6 | Rank7 | Rank8 |
|---|---|---|---|---|---|---|---|---|---|
| $W_1 = \frac{1}{\sqrt{8}} H_{1,1,1}(1, 1, 1, 1)$ | 1 | 1 | 15 | 135 | 1357 | 12357 | 123567 | 1234567 | 12345678 |
| | 2 | 2 | 24 | 124 | 1247 | 12478 | 124578 | 1245678 | n/a |
| | 3 | 3 | 13 | 123 | 1234 | 12345 | 123457 | 1234578 | n/a |
| | 4 | 4 | 48 | 148 | 1458 | 14568 | 124568 | 1234568 | n/a |
| | 5 | 5 | 57 | 567 | 5678 | 15678 | 135678 | 1235678 | n/a |
| | 6 | 6 | 26 | 246 | 2468 | 24678 | 124678 | 1234678 | n/a |
| | 7 | 7 | 37 | 237 | 2367 | 23467 | 234678 | 2345678 | n/a |
| | 8 | 8 | 68 | 568 | 3568 | 34568 | 134568 | 1345678 | n/a |
| $W_2 = \frac{1}{\sqrt{8}} H_{3,3,3}(3, 3, 3, 3)$ | 9 | 1 | 13 | 135 | 1357 | 12357 | 123567 | 1234567 | 12345678 |
| | 10 | 2 | 24 | 246 | 2468 | 23468 | 234678 | 2345678 | n/a |
| | 11 | 3 | 35 | 357 | 3457 | 34567 | 134567 | 1345678 | n/a |
| | 12 | 4 | 46 | 468 | 4678 | 14678 | 124678 | 1234678 | n/a |
| | 13 | 5 | 57 | 157 | 1257 | 12567 | 124567 | 1245678 | n/a |
| | 14 | 6 | 68 | 268 | 2678 | 23678 | 123678 | 1235678 | n/a |
| | 15 | 7 | 17 | 137 | 1237 | 12378 | 123578 | 1234578 | n/a |
| | 16 | 8 | 28 | 248 | 2348 | 23458 | 234568 | 1234568 | n/a | where the numbers shown in the column for each rank refer to the column index of the matrices $$W_1 = \frac{1}{\sqrt{8}} H_{1,1,1}(1, 1, 1, 1) \text{ and } W_2 = \frac{1}{\sqrt{8}} H_{3,3,3}(3, 3, 3, 3).$$

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10A illustrates a codebook that shows a mapping from a base matrix to a codeword according to an embodiment of this disclosure;

FIG. 10B illustrates a table further describing rank 1 of the codebook of FIG. 10A according to an embodiment of this disclosure;

FIG. 11 illustrates two rank-8 matrices and according to an embodiment of this disclosure;

FIG. 12 illustrates a codebook that shows a mapping from a base matrix to a codeword according to another embodiment of this disclosure;

FIG. 13 illustrates a codebook that shows a mapping from a base matrix to a codeword according to yet another embodiment of this disclosure;

FIG. 14 illustrates a codebook that shows a mapping from a base matrix to a codeword according to a further embodiment of this disclosure;

FIG. 15 illustrates a codebook that shows a mapping from a base matrix to a codeword according to yet a further embodiment of this disclosure;

DETAILED DESCRIPTION OF THE INVENTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Figure 1:
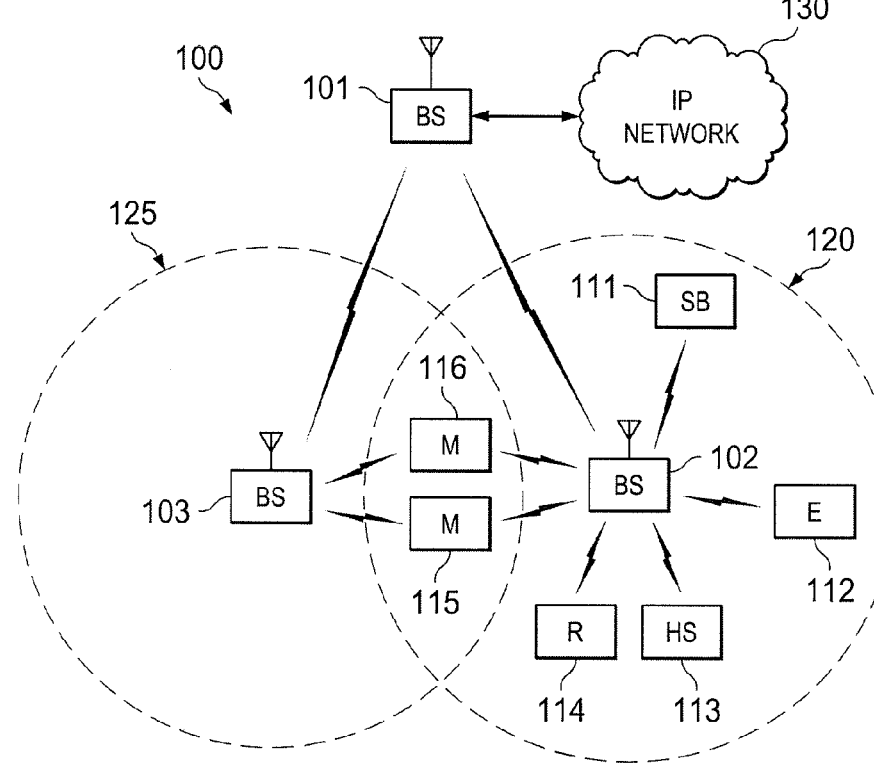
FIG. 1 illustrates an exemplary wireless network that transmits messages in the uplink according to the principles of this disclosure.

FIG. 1 illustrates exemplary wireless network 100, which transmits messages according to the principles of this disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
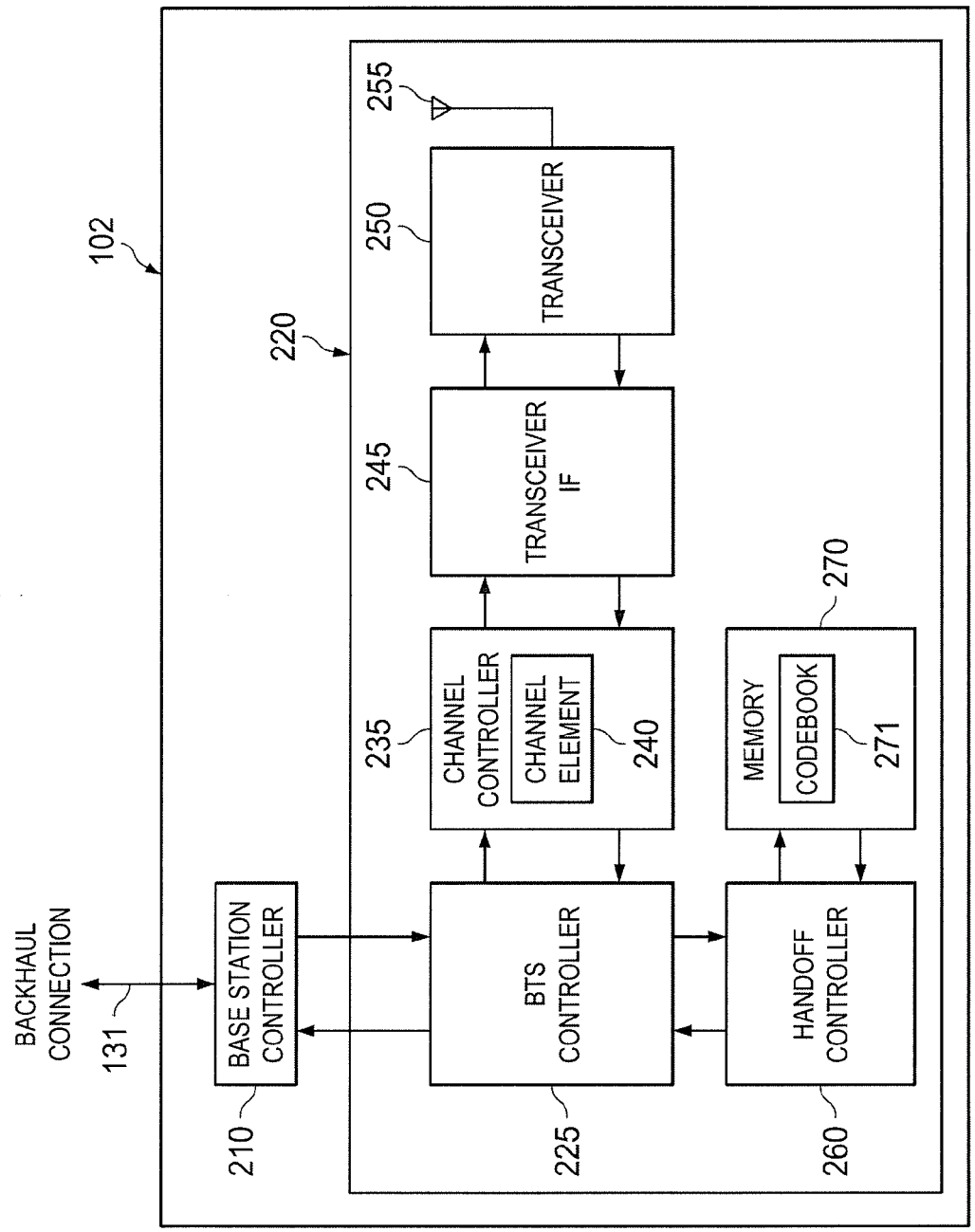
FIG. 2 illustrates an exemplary base station in greater detail according to one embodiment of this disclosure.

FIG. 2 illustrates an exemplary base station in greater detail according to one embodiment of this disclosure. The embodiment of base station (BS) 102 illustrated in FIG. 2 is for illustration only. Other embodiments of the BS 102 could be used without departing from the scope of this disclosure.

BS 102 comprises a base station controller (BSC) 210 and a base transceiver subsystem (BTS) 220. A base station controller is a device that manages wireless communications resources, including base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces, RF transmitters and RF receivers. For the purpose of simplicity and clarity in explaining the operation of this disclosure, the base transceiver subsystem and the base station controller associated with each base transceiver subsystem are collectively represented by BS 101, BS 102 and BS 103, respectively.

BSC 210 manages the resources in a cell site including BTS 220. BTS 220 comprises a BTS controller 225, a channel controller 235, a transceiver interface (IF) 245, an RF transceiver unit 250, and an antenna array 255. Channel controller 235 comprises a plurality of channel elements including an exemplary channel element 240. BTS 220 also comprises a handoff controller 260 and a memory 270. The embodiment of handoff controller 260 and memory 270 included within BTS 220 is for illustration only. Handoff controller 260 and memory 270 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements including channel element 240 that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an embodiment of this disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can comprise separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of this disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of this disclosure, BTS controller 225 is configured to store a codebook 271 in memory 270. The codebook 271 is used by BS 102 to perform beamforming with a mobile station. Memory 270 can be any computer readable medium. For example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. A part of memory 270 comprises a random access memory (RAM), and another part of memory 270 comprises a Flash memory that acts as a read-only memory (ROM).

BSC 210 is configured to maintain communications with BS 101, BS 102 and BS 103. BS 102 communicates with BS 101 and BS 103 via a wireless connection. In some embodiments, the wireless connection is a wire-line connection.

Figure 3:
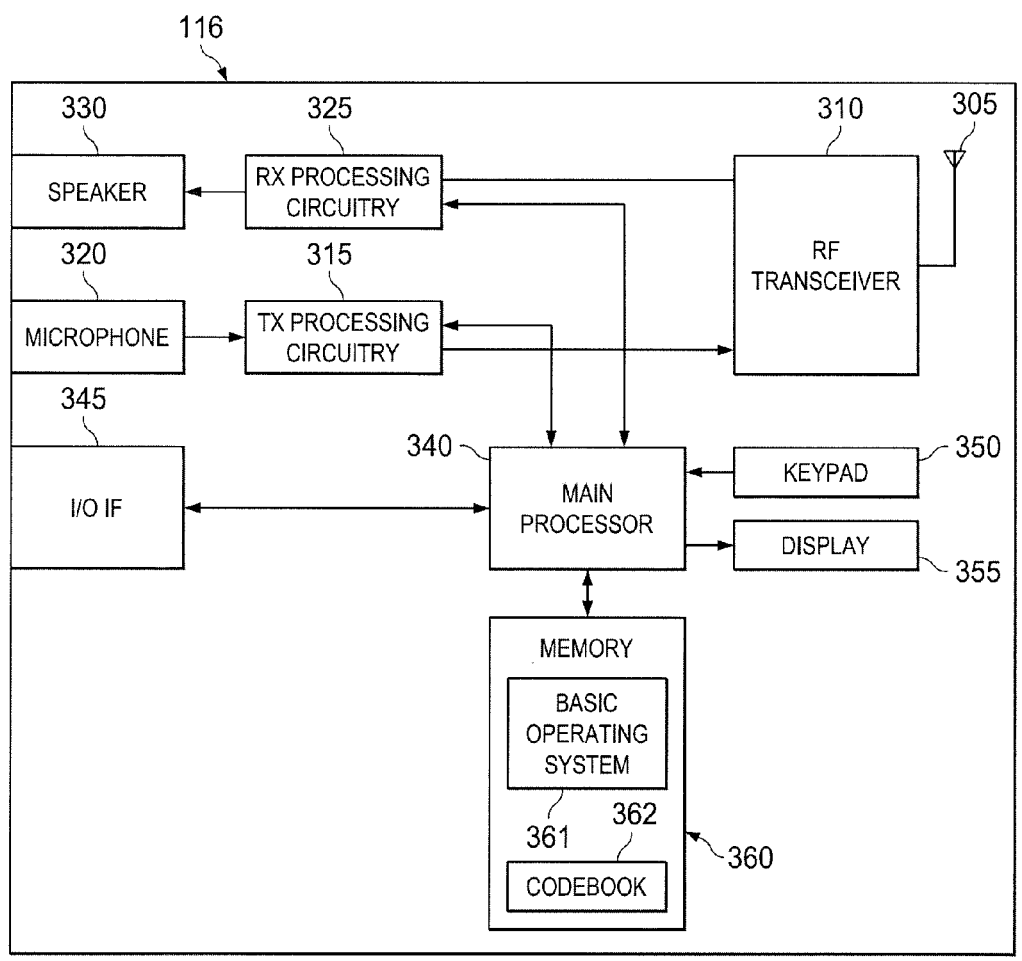
FIG. 3 illustrates an exemplary wireless subscriber station in greater detail according to one embodiment of this disclosure.

FIG. 3 illustrates an exemplary wireless subscriber station in greater detail according to one embodiment of this disclosure. The embodiment of wireless subscriber station (SS) 116 illustrated in FIG. 3 is for illustration only. Other embodiments of the wireless SS 116 could be used without departing from the scope of this disclosure.

Wireless SS 116 comprises an antenna 305, a radio frequency (RF) transceiver 310, a transmit (TX) processing circuitry 315, a microphone 320, and a receive (RX) processing circuitry 325. SS 116 also comprises a speaker 330, a main processor 340, an input/output (I/O) interface (IF) 345, a keypad 350, a display 355, and a memory 360. Memory 360 further comprises a basic operating system (OS) program 361 and a codebook 362 used by SS 116 to perform beamforming with a base station.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of this disclosure, main processor 340 is a microprocessor or microcontroller. Memory 360 is coupled to main processor 340. According to some embodiments of this disclosure, a part of memory 360 comprises a random access memory (RAM) and another part of memory 360 comprises a Flash memory that acts as a read-only memory (ROM).

Main processor 340 executes a basic operating system (OS) program 361 stored in memory 360 in order to control the overall operation of wireless SS 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315 in accordance with well-known principles.

Main processor 340 is capable of executing other processes and programs resident in memory 360. Main processor 340 can move data into or out of memory 360 as required by an executing process. Main processor 340 also is coupled to I/O interface 345. I/O interface 345 provides SS 116 with the ability to connect to other devices such as laptop computers and handheld computers. I/O interface 345 is the communication path between these accessories and main controller 340.

Main processor 340 also is coupled to keypad 350 and display unit 355. The operator of SS 116 uses keypad 350 to enter data into SS 116. Display 355 may be a liquid crystal display (LCD) capable of rendering text and/or at least limited graphics from web sites. Alternate embodiments may use other types of displays.

The example of system level description for the new invention is shown in 1, where a base station is simultaneously communicated with multiple of mobile stations through the use of multiple antenna beams, each forming an antenna beam toward its intended mobile station at the same time and same frequency. It is noted that, in a wireless communication, the communication from a base station to a mobile station is also known as downlink communication. The base station and mobile stations are employing multiple antennas for transmission and reception of radio wave signals. The radio wave signals can be Orthogonal Frequency Division Multiplexing (OFDM) signals. The mobile stations can be a PDA, laptop, or handheld device.

Figure 4:
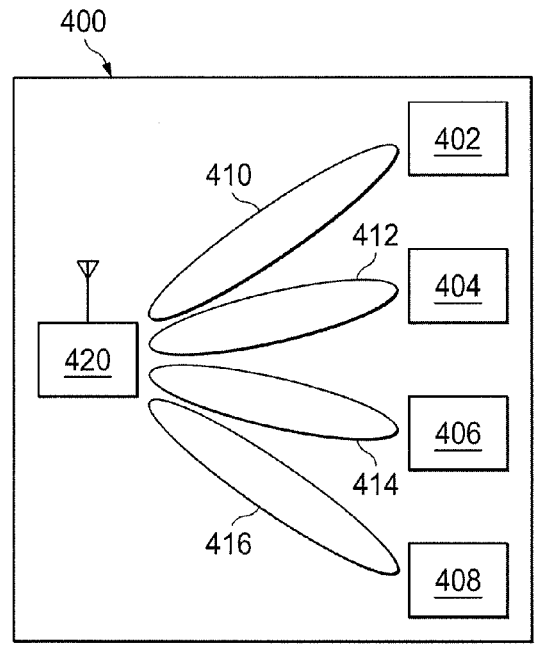
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of the present disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to known as downlink communication and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The OFDM transmission scheme is used to multiplex data in the frequency domain. Modulation symbols are carried on frequency sub-carriers. The quadrature amplitude modulation (QAM) modulated symbols are serial-to-parallel converted and input to the inverse fast Fourier transform (IFFT). At the output of the IFFT, N time-domain samples are obtained. Here N refers to the IFFT/fast Fourier transform (FFT) size used by the OFDM system. The signal after IFFT is parallel-to-serial converted and a cyclic prefix (CP) is added to the signal sequence. CP is added to each OFDM symbol to avoid or mitigate the impact due to multipath fading. The resulting sequence of samples is referred to as an OFDM symbol with a CP. At the receiver side, assuming that perfect time and frequency synchronization are achieved, the receiver first removes the CP, and the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in time domain, the sub-carriers overlap with each other in frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier-interference (ICI).

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

Figure 5:
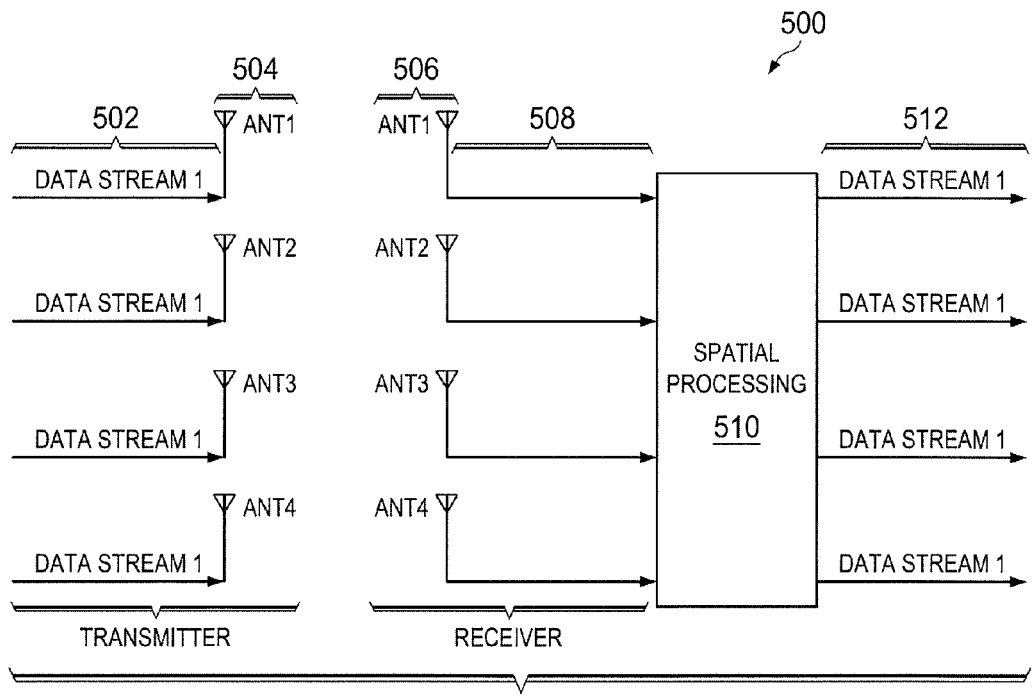
FIG. 5 illustrates a 4×4 MIMO system according to an embodiment of this disclosure.

FIG. 5 illustrates a 4×4 MIMO system 500 according to an embodiment of this disclosure.

In this example, four different data streams 502 are transmitted separately using four transmit antennas 504. The transmitted signals are received at four receive antennas 506 and interpreted as received signals 508. Some form of spatial signal processing 510 is performed on the received signals 508 in order to recover four data streams 512.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit/receive diversity scheme and a transmit/receive beamforming scheme to improve the link reliability or system capacity in wireless communication systems.

The MIMO channel estimation consists of estimating the channel gain and phase information for links from each of the transmit antennas to each of the receive antennas. Therefore, the channel response "H" for N×M MIMO system consists of an N×M matrix, as shown in Equation 1 below:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{M2} & \ldots & a_{NM} \end{bmatrix}. \quad [\text{Eqn. 1}]$$

In Equation 1, the MIMO channel response is represented by H and $a_{nm}$ represents the channel gain from transmit antenna n to receive antenna m. In order to enable the estimations of the elements of the MIMO channel matrix, separate pilots may be transmitted from each of the transmit antennas.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 6:
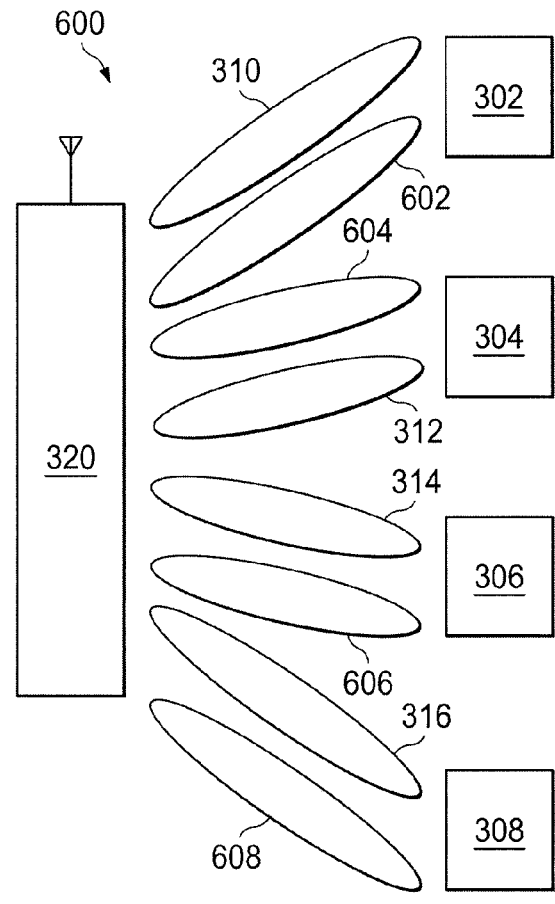
FIG. 6 illustrates a Spatial Division Multiple Access (SDMA) scheme according to an embodiment of this disclosure.

FIG. 6 illustrates an SDMA scheme according to an embodiment of this disclosure.

As shown in FIG. 6, base station 320 is equipped with 8 transmit antennas while four mobile stations 302, 304, 306, and 308 are each equipped two antennas. In this example, base station 320 has eight transmit antennas. Each of the transmit antennas transmits one of beamformed signals 310, 602, 604, 312, 314, 606, 316, and 608. In this example, mobile station 302 receives beamformed transmissions 310 and 602, mobile station 304 receives beamformed transmissions 604 and 312, mobile station 306 receives beamformed transmissions 606 and 314, and mobile station 308 receives beamformed transmissions 608 and 316.

Since base station 320 has eight transmit antenna beams (each antenna beams one stream of data streams), eight streams of beamformed data can be formed at base station 320. Each mobile station can potentially receive up to 2 streams (beams) of data in this example. If each of the mobile stations 302, 304, 306, and 308 was limited to receive only a single stream (beam) of data, instead of multiple streams simultaneously, this would be multi-user beamforming (i.e., MU-BF).

A multi-user closed-loop transmit beamforming (MU-CLTB) scheme in MIMO systems allows base station 320 to employ transmit beamforming and is communicated simultaneously to multiple mobile stations through the use of OFDM radio signals.

A practical closed-loop transmit beamforming scheme is typically based on a codebook design. A codebook is a set of pre-determined antenna beams that are known to mobile stations. Closed-loop codebook-based transmit beamforming has been used for a scenario where a base station forms a transmit antenna beam toward a single user at a time and at a certain frequency.

It has been known that a codebook based pre-coding MIMO can provide significant spectral efficiency gain in the downlink closed-loop MIMO. In the IEEE 802.16e and 3GPP LTE standards, a 4 TX limited feedback based closed-loop MIMO configuration is supported. However, in IEEE 802.16m and 3GPP LTE Advanced standards, in order to provide peak spectral efficiency, an 8 TX antenna configuration is proposed as a prominent precoding closed loop MIMO downlink system.

There is a tradeoff between the performance and the size of the codebook. Having a large size codebook gives better performance than having smaller number of codewords. However, the amount of performance improvement eventually decreases with an increase in codebook size. In addition, when rank adaptation is used, the large size of a codebook implies a large amount of channel quality index (CQI) calculations.

As a practical scenario, a 10λ dimension is usually required for the whole array at the BS (i.e., for a 8 Tx system, there is less than 1.5λ of spacing between two adjacent antennas). This means the channel is highly correlated at the BS side. In this correlated channel scenario, a small codebook can provide sufficient spectral efficiency.

One of the strongest requirements of a codebook is to have a constant modulus (CM) property as the baseline to ensure power amplifier balance. As a result of this constraint, designing codebook is similar to designing equal gain transmission precoders.

Rank adaptation can be used to improve the spectral efficiency of low geometry users. When all of the lower rank codewords are reused for constructing higher rank codewords, the codebook is said to have a nested property. This nested property reduces the complexity required to calculate the CQI when rank adaptation is performed.

From a system design point of view, it is beneficial if a large dimensional codeword is generated from a lower dimensional generating vectors or matrices. This decreases the memory required to store the generating vectors or matrices and decreases the physical dimensions of a system required to generate the codeword.

In the 3GPP LTE standard, a 4 TX codebook is generated based on the Householder reflection given the same dimensional 16 generating vectors. This requires a large memory size to store 64 elements of the generating vectors. The main benefit of the Householder reflection is that it gives a 4×4 unitary matrix with a constant modulus property. However, the 4 dimensional Householder reflection is the special case where the constant modulus property is preserved. For the other dimensions, the constant modulus property of the Householder reflection is broken. Since the constant modulus is the strongest requirement for the system, Householder reflection is not an appropriate approach for designing 8 TX codebook including other dimensions.

The present disclosure provides a system and method for constructing a CM codebook that provides significant spectral efficiency gain in the downlink of a closed-loop MIMO system without exception.

In one embodiment of the present disclosure, a systematic codebook design methodology for the constraint M-ary alphabet and for any $2^n$-dimensional antennas is provided.

In particular embodiments, a 4-bit codebook design for 8 TX antennas with M-ary alphabet is provided. For the M-ary phase-shift keying (M-PSK) alphabet, a set of transformation matrices is defined as shown in Equation 2 below:

$$\Gamma_M = \{T_1, T_2, \ldots, T_{M/2}\},$$ [Eqn. 2]

where $$T_i = \begin{bmatrix} 1 & 1 \\ e^{j2\pi(i-1)/M} & -e^{j2\pi(i-1)/M} \end{bmatrix}$$

for $$i = 1, 2, \ldots, M/2.$$

The $T_i$ forms a 2×2 unitary matrix and is used to transform the generation matrix used to construct the larger dimension matrix. Given the set of transformation matrix $\Gamma_M$ for M-PSK, several complex Hadamard (CH) transformations can be defined. For example, given any two generating matrix $V_1$ and $V_2 \in U^{m \times n}$, where $U^{m \times n}$ denotes the m×n dimensional matrix space whose columns are orthonormal each other, a one-stage complex Hadamard (CH) transformation can be defined as shown in Equation 3 belows:

$$H_i(V_1, V_2) \equiv (T_i \otimes I_m)[I_2(:, 1) \otimes V_1, I_2(:, 2) \otimes V_2]$$ [Eqn. 3]
$$= [T_i(:, 1) \otimes V_1, T_i(:, 2) \otimes V_2]$$
$$= W_i^{(1)},$$

where $I_m$ denotes the m-dimensional identity matrix, $H_i(V_1, V_2) \in U^{2m \times 2n}$, $\otimes$ denotes the Kronecker product, and superscript in the resulting matrix $W_i^{(1)}$ denotes the number of the transformation stages.

Figure 7:
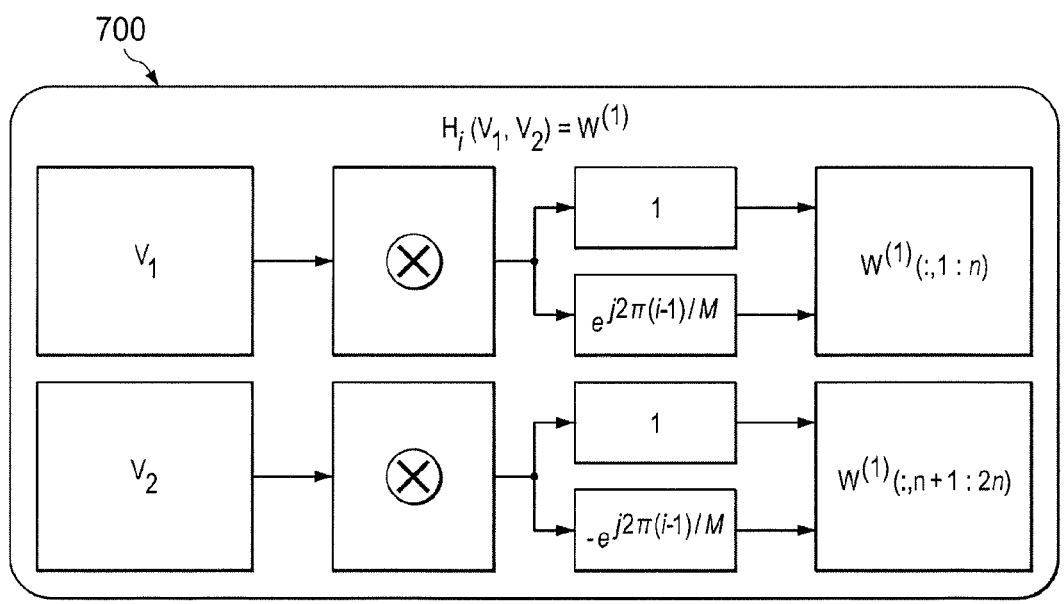
FIG. 7 illustrates a one-stage complex Hadamard (CH) transformation according to an embodiment of this disclosure.

FIG. 7 illustrates a one-stage CH transformation 700 according to an embodiment of this disclosure.

As shown in FIG. 7, when i=1, transformation 700 is equivalent to a real Hadamard transformation. With the one-stage complex Hadamard transformation, a 2m×2n matrix with orthonormal columns is generated.

In a similar way, a two-stage complex Hadamard transformation can be defined. Given any generating matrix $V_1$, $V_2$, $V_3$ and $V_4 \in U^{m \times n}$, a two stage complex Hadamard transformation is defined as shown in Equation 4 below:

$$H_{i,k,l}(V_1, V_2, V_3, V_4) \equiv H_i(W_k^{(1)}, W_l^{(1)})$$ [Eqn. 4]
$$= H_i(H_k(V_1, V_2), H_l(V_3, V_4))$$

-continued $$= \begin{bmatrix} T_i(:, 1) \otimes H_k(V_1, V_2), \\ T_i(:, 1) \otimes H_l(V_3, V_4) \end{bmatrix}$$

$$= \begin{pmatrix} T_i(:, 1) \otimes [T_k(:, 1) \otimes V_1, T_k(:, 2) \otimes V_2], \\ T_i(:, 1) \otimes [T_l(:, 1) \otimes V_3, T_l(:, 2) \otimes V_4] \end{pmatrix}$$

$$= W_i^{(2)},$$

where $1 \leq i,k,l \leq M/2$ and the resulting matrix $W_i^{(2)}$ forms a 4m×4n matrix with orthonormal columns.

Figure 8:
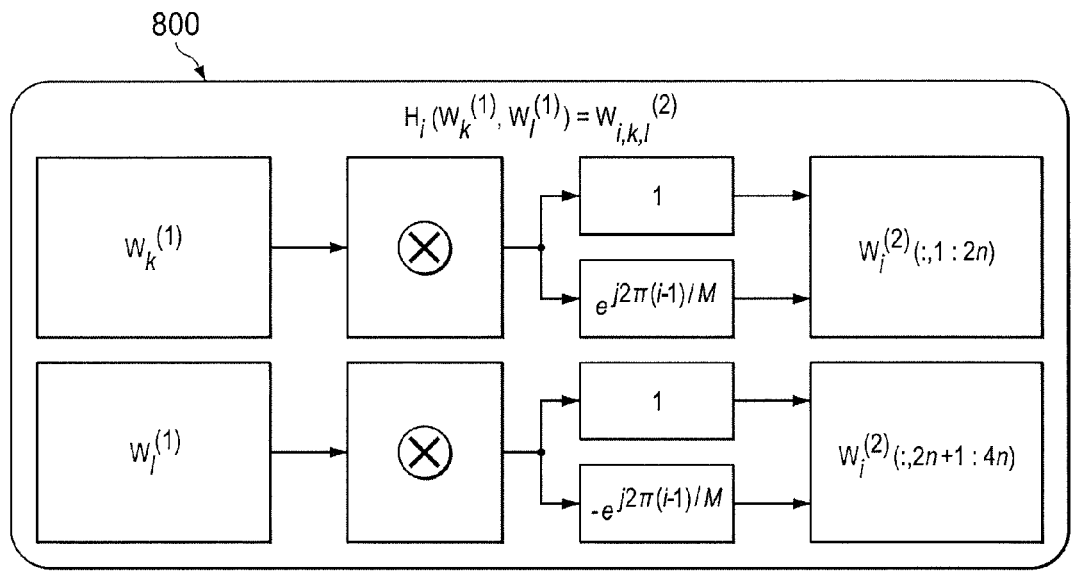
FIG. 8 illustrates a two-stage CH transformation according to an embodiment of this disclosure.

FIG. 8 illustrates a two-stage CH transformation 800 according to an embodiment of this disclosure.

This kind of extension can be performed to N-stage transformations to construct an Nm×Nn matrix by recursively applying the transformations.

Figure 9:
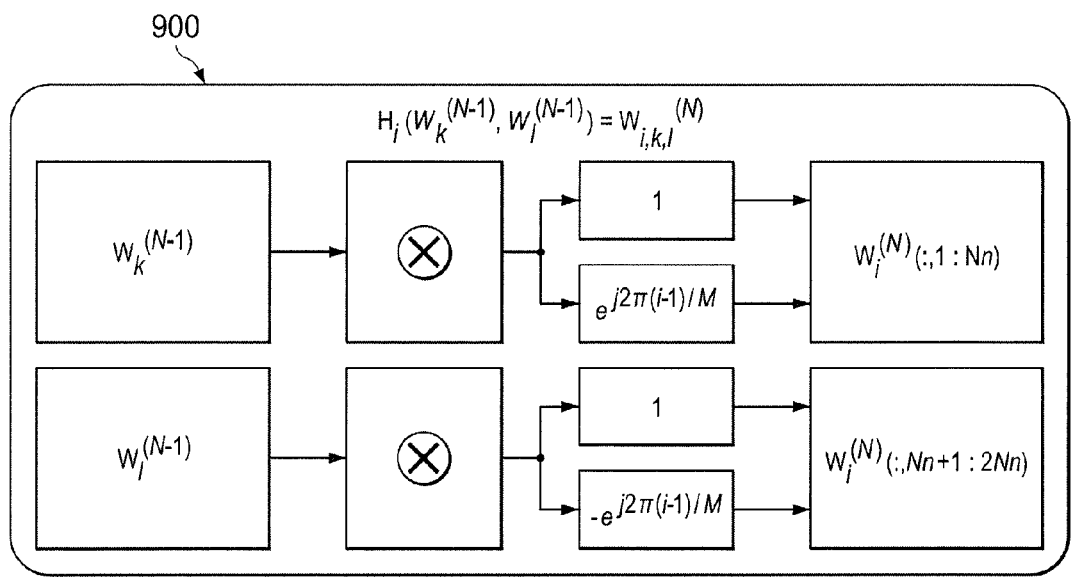
FIG. 9 illustrates an N-stage CH transformation according to an embodiment of this disclosure.

FIG. 9 illustrates an N-stage CH transformation 900 according to an embodiment of this disclosure.

If the entries of the generating matrice $V_j$ are restricted to the set of M-PSK alphabets, the above described N-stage CH transformation 900 defined in M-PSK alphabet as shown in Equation 4 provides a convenient way of generating a set of Nm×Nn matrices with M-PSK entries. A simple way to define a set of M-PSK generating matrix is to restrict $V_j$ to $\Gamma_M$, i.e. $V_j \in \Gamma_M$. Accordingly, the CH transformation 900 defined for an M-PSK alphabet provides a convenient way of generating a set of $2^N \times 2^N$ unitary matrices with M-PSK alphabets. The resulting unitary matrix contains a rotation of the block diagonal matrix that provides a good channel matching property with dual-polarized antennas given the appropriate column subset selection for the different rank of transmissions.

Using the above defined complex Hadamard transformations shown in Equation 4, a discrete Fourier transform (DFT) matrix is constructed by performing a simple column permutation. For example, a 4-dimensional DFT matrix can be constructed with the one-stage transformation shown in Equation 5 below:

$$DFT_4 = \frac{1}{\sqrt{4}} H_1(T_1, T_3) P_4 \qquad [\text{Eqn. 5}]$$

$$= \frac{1}{\sqrt{4}} [T_1(:, 1) \otimes T_1, T_1(:, 2) \otimes T_3] P_4,$$

where $P_4$ denotes the column permutation matrix:

$$P_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

An 8-dimensional DFT matrix can also be constructed with the two-stages transformations shown in Equation 6 below:

$$DFT_8 = \frac{1}{\sqrt{8}} H_1(H_3(T_1, T_3), H_3(T_2, T_4)) P_8 \qquad [\text{Eqn. 6}]$$

$$= \frac{1}{\sqrt{8}} \begin{pmatrix} T_1(:, 1) \otimes [T_3(:, 1) \otimes T_1, T_3(:, 2) \otimes T_2], \\ T_1(:, 1) \otimes [T_3(:, 1) \otimes T_2, T_3(:, 2) \otimes T_4] \end{pmatrix} P_8,$$

where $P_8$ denotes the column permutation matrix:

$$P_8 = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \end{bmatrix}.$$

Since the effect of the column permutation matrix can be merged with the column subset strategy of the base matrix, the designed codebook can include the DFT matrix itself as a base matrix in some embodiments of the present disclosure.

In another embodiment of the present disclosure, a 4-bit 8 TX codebook with an 8-PSK alphabet using the disclosed unitary matrix construction system and method is provided. Given the nested property incorporated with rank adaptation, an 8 TX transmit precoder is constructed as a column subset of the unitary base matrix. For the 8 TX case, a two-stage complex Hadamard (CH) transformation is used to generate a set of 8×8 base matrices. For notational convenience, the two-stage transformation is redefined as shown in Equation 7 below:

$$H_{i,k,l}(T_{m1}, T_{m2}, T_{m3}, T_{m4}) \equiv H_{i,k,l}(m1, m2, m3, m4) \qquad [\text{Eqn. 7}]$$

$$= (T_i(:, 1) \otimes [H_k(m1, m2)],$$

$$T_i(:, 2) \otimes [H_l(m3, m4)])$$

$$= H_i(H_k(m1, m2), H_l(m3, m4)).$$

FIG. 10A illustrates a codebook that shows a mapping from a base matrix to a codeword according to an embodiment of this disclosure. Only the column indices of the corresponding base matrices are shown in codebook 1000 for brevity.

Codebook 1000 is non-QPSK based. The 4-bit 8 TX codebook 1000 is constructed based on two 8×8 base matrices. Such a codebook is designed to work well with SP antenna configurations and is aimed to support both SU-MIMO and MU-MIMO. That is, the codebook is designed to optimize both an uncorrelated antenna array (SU-MIMO) and a correlated antenna array (MU-MIMO).

The base codebook is constructed from two matrices V8(:,:,1) and V8(:,:,2), which are constructed as described in Equation 8 below where:

$$T1 = \begin{bmatrix} 1 & 1 \\ 1 & -1 \end{bmatrix},$$

$$T2 = \begin{bmatrix} 1 & 1 \\ \frac{1+j}{\sqrt{2}} & -\frac{1+j}{\sqrt{2}} \end{bmatrix},$$

$$T3 = \begin{bmatrix} 1 & 1 \\ j & -j \end{bmatrix}, \text{ and}$$

$$T4 = \begin{bmatrix} 1 & 1 \\ \frac{-1+j}{\sqrt{2}} & -\frac{-1+j}{\sqrt{2}} \end{bmatrix}$$

are used to define $$H_i(m1, m2) \equiv H_i(T_{m1}, T_{m2}) \quad [\text{Eqn. 8}]$$
$$= [T_i(:,1) \otimes T_{m1}, T_i(:,2) \otimes T_{m2}], \text{ and}$$

$$H_{i,k,l}(T_{m1}, T_{m2}, T_{m3}, T_{m4}) \equiv H_{i,k,l}(m1, m2, m3, m4)$$
$$= (T_i(:,1) \otimes [H_k(m1, m2)],$$
$$T_i(:,2) \otimes [H_l(m3, m4)])$$
$$= H_i(H_k(m1,m2)H_l(m3,m4)).$$

With regard to codebook 1000, the numbers shown in the column for each rank refer to the column index of the matrices V8(:,:,1) and V8(:,:,2).

FIG. 10B illustrates a table 1010 further describing rank 1 of the codebook 1000 of FIG. 10A according to an embodiment of this disclosure.

FIG. 11 illustrates two rank-8 matrices 1110 and 1120 according to an embodiment of this disclosure.

In a particular embodiment, the rank-1 8 TX beamforming codebook is optimized for correlated antenna arrays. The base matrix of the disclosed rank-1 8 TX codebook is denoted as V8(:,:,3), and the size of the base matrix V8(:,:,3) is 8×16. The j-th column vector of the base matrix V8(:,:,3) is given by Equation 9 below:

$$V_8(:,k,3) = \frac{1}{\sqrt{8}} \begin{bmatrix} 1 \\ e^{j\pi\sin(\theta_k)} \\ e^{j2\pi\sin(\theta_k)} \\ e^{j3\pi\sin(\theta_k)} \\ e^{j4\pi\sin(\theta_k)} \\ e^{j5\pi\sin(\theta_k)} \\ e^{j6\pi\sin(\theta_k)} \\ e^{j7\pi\sin(\theta_k)} \end{bmatrix}, \quad [\text{Eqn. 9}]$$

where k=1, 2, . . . 16.

One example of the set of $\theta_j$, k=1, . . . , 16, is a set where all beams have uniform angular spacing. In particular, in a 3-sector system where each sector has 120 degrees angular spacing, the set $\theta_j$, k=1, . . . , 16, is given by Equation 10 below:

$$\theta_k = ((k-1) + 1/2) * \frac{\pi}{24} - \frac{\pi}{3} \text{ (degrees)} \quad [\text{Eqn. 10}]$$

if the reference angle (i.e, the 0-degree direction) corresponds to the phase center of the antenna array.

FIG. 12 illustrates a codebook 1200 that shows a mapping from a base matrix to a codeword according to another embodiment of this disclosure. Only the column indices of the corresponding base matrices are shown in codebook 1200 for brevity.

Codebook 1200 is non-QPSK based and is constructed from four 8×8 base matrices. Codebook 1200 is designed to work well with an SP antenna configuration and is aimed to support both SU-MIMO and MU-MIMO. That is, codebook 1200 is designed to optimize both an uncorrelated antenna array (SU-MIMO) and a correlated antenna array (MU-MIMO).

In some embodiments, codebook 1200 is a 3-bit 8 TX codebook. In a particular embodiment, the base matrix V8(:,:, 4) is used for rank-1 transmission while the base matrix V8(:,:,2) is used for transmissions with a rank greater than or equal to 2.

In a further particular embodiment, the disclosed rank-1 8 TX beamforming codebook is optimized for a correlated antenna array in a 3-sector system where each sector has 120 degrees angular spacing. The base matrix of the disclosed rank-1 8TX codebook is denoted as V8(:,:,4), and the size of the base matrix V8(:,:,4) is 8×8. The j-th column vector of the base matrix V8(:,:,4) is given by Equation 11 below:

$$V_8(:,k,4) = \frac{1}{\sqrt{8}} \begin{bmatrix} 1 \\ e^{j\pi\sin(\theta_k)} \\ e^{j2\pi\sin(\theta_k)} \\ e^{j3\pi\sin(\theta_k)} \\ e^{j4\pi\sin(\theta_k)} \\ e^{j5\pi\sin(\theta_k)} \\ e^{j6\pi\sin(\theta_k)} \\ e^{j7\pi\sin(\theta_k)} \end{bmatrix}. \quad [\text{Eqn. 11}]$$

where k=1, 2, . . . 8.

In yet another particular embodiment, $\theta_j$, k=1, . . . , 8, is a set where all beams have uniform angular spacing as shown in Equation 12 below:

$$\theta_k = ((k-1) + 1/2) * \frac{\pi}{12} - \frac{\pi}{3} \text{(degrees)} \quad [\text{Eqn. 12}]$$

if the reference angle (i.e, the 0-degree direction) corresponds to the phase center of the antenna array.

With regard to codebook 1200, the numbers shown in the column for each rank refer to the column index of the matrices V8(:,:,2) and V8(:,:,4).

FIG. 13 illustrates a codebook 1300 that shows a mapping from a base matrix to a codeword according to a further embodiment of this disclosure. Only the column indices of the corresponding base matrices are shown in codebook 1300 for brevity.

Codebook 1300 is non-QPSK based and is constructed from eight 8×8 base matrices. Codebook 1300 is designed to work well with SP antenna configurations and is aimed to support both SU-MIMO and MU-MIMO. That is, codebook 1300 is designed to optimize both an uncorrelated antenna array (SU-MIMO) and a correlated antenna array (MU-MIMO).

In some embodiments, codebook 1300 is a 3-bit 8 TX codebook. In a particular embodiment, the base matrix V8(:,:, 4) is used for rank-1 transmission while the base matrix V8(:,:,1) is used for transmissions with a rank greater than or equal to 2.

With regard to codebook 1300, the numbers shown in the column for each rank refer to the column index of the matrices V8(:,:,1) and V8(:,:,4).

FIG. 14 illustrates a codebook 1400 that shows a mapping from a base matrix to a codeword according to yet another embodiment of this disclosure. Only the column indices of the corresponding base matrices are shown in codebook 1400 for brevity.

Codebook 1400 is non-QPSK based. Codebook 1400 is designed to work well with SP antenna configuration and is aimed to support both SU-MIMO and MU-MIMO. That is, the codebook is designed to optimize both an uncorrelated antenna array (SU-MIMO) and a correlated antenna array (MU-MIMO).

In some embodiments, codebook 1400 is a 3-bit 8 TX codebook. In a particular embodiment, the base matrix V8(:,:, 5) is used for rank-1 transmission while the base matrix V8(:,:,2) or V8(:,:,1) is used for transmissions with a rank greater than or equal to 2.

In one embodiment, the disclosed rank-1 8 TX beamforming codebook 1400 is optimized for a correlated antenna array in a 3-sector system where each sector has 120 degrees angular spacing. One example of the set of $\theta_j$, j=1, ..., 8, is a set where all beams have uniform angular spacing is given by Equation 13 below:

$$V_8(:,k,5) = \frac{1}{\sqrt{8}} \begin{bmatrix} 1 \\ e^{j2\pi*D*\sin(\theta_k)} \\ e^{j2\pi*2*D*\sin(\theta_k)} \\ e^{j2\pi*3*D*\sin(\theta_k)} \\ e^{j2\pi*4*D*\sin(\theta_k)} \\ e^{j2\pi*5*D*\sin(\theta_k)} \\ e^{j2\pi*6*D*\sin(\theta_k)} \\ e^{j2\pi*7*D*\sin(\theta_k)} \end{bmatrix}, \quad \text{[Eqn. 13]}$$

where k=1, 2, ... 8.

where D is the minimum antenna spacing between two antenna elements in a linear antenna array and is expressed as a number of wavelengths. One example of the set of $\theta_j$, k=1, ..., 8, is a set where all beams have uniform angular spacing is given by Equation 14 below:

$$\theta_k = ((k-1)+1/2) * \frac{\pi}{12} - \frac{\pi}{3} \text{(degrees)} \quad \text{[Eqn. 14]}$$

if the reference angle (i.e, the 0-degree direction) corresponds to the phase center of the antenna array.

With regard to codebook 1400, the numbers shown in the column for each rank refer to the column index of the matrices V8(:,:,1), V8(:,:,2) and V8(:,:,5).

In particular embodiments, codebooks 1200, 1300, and 1400 are 3-bit codebook and are designed to work well with SP antenna configurations. These three codebooks are aimed to support both SU-MIMO and MU-MIMO operations. That is, codebooks 1200, 1300, and 1400 are designed to optimize both an uncorrelated antenna array (SU-MIMO) and a correlated antenna array (MU-MIMO).

In another embodiment, a codebook subset restriction rule is used for these three codebooks. In a particular embodiment, the CW (code word) size of these codebooks is 16. This means that it normally requires 4 bits to carry 16 CWs. In such an embodiment, a subset of these three codebooks is used. In a particular embodiment, 3 bits are used to carry 8 CWs. Using such a codebook subset restriction allows SU-MIMO and MU-MIMO operations to be jointly optimized. That is, for rank-1 transmission, the base matrix W4 or W5 is used to optimize a correlated array for MU-MIMO operation while the base matrix W2 or W1 is used for the case where the rank of transmission is greater than or equal to 2, which is optimized for an uncorrelated antenna array for SU-MIMO operation.

The number of column vectors of V8(:,:,1), V8(:,:,2), V8(:,:,4), and V8(:,:,5) base matrix is 8, which requires only 3 bits to represent the 8 column vectors. Because the disclosed codebooks and subset restriction is used for closed-loop SU-MIMO and MU operations, a mobile station or user terminal (UE) reports CQI (channel quality index) to its serving base stations. The reported CQI includes the rank of the codebook and the CW index for a reported rank (namely, PMI (precoder matrix index) or PVI (precoder vector index)).

FIG. 15 illustrates a codebook 1500 that shows a mapping from a base matrix to a codeword according to yet another embodiment of this disclosure. Only the column indices of the corresponding base matrices are shown in codebook 1500 for brevity.

Codebook 1500 is designed to work well with an SP antenna configuration and is aimed to have a minimum number of base matrices (i.e., two base matrices). The entries of the two base matrices are given by Equations 15 and 16 below:

$$W_1 = \frac{1}{\sqrt{8}} H_{1,1,1}(1,1,1,1) = \quad \text{[Eqn. 15]}$$

$$\frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}, \text{ and}$$

$$W_2 = \frac{1}{\sqrt{8}} H_{3,3,3}(3,3,3,3) = \quad \text{[Eqn. 16]}$$

$$\frac{1}{\sqrt{8}} \begin{bmatrix} 1 & 1 & 1 & 1 & 1 & 1 & 1 & 1 \\ j & -j & j & -j & j & -j & j & -j \\ j & j & -j & -j & j & j & -j & -j \\ -1 & 1 & 1 & -1 & -1 & 1 & 1 & -1 \\ j & j & j & j & -j & -j & -j & -j \\ -1 & 1 & -1 & 1 & 1 & -1 & 1 & -1 \\ -1 & -1 & 1 & 1 & 1 & 1 & -1 & -1 \\ -j & j & j & -j & j & -j & -j & j \end{bmatrix}.$$

As shown in FIG. 15, codebook 1500 consists of a QPSK alphabet only, and the codewords are extracted from two 8×8 unitary base matrices. The base matrices are designed using the two-stage complex Hadamard transformations. In terms of CQI calculation, the disclosed codebook 1500 computes $HF_i$ for i=1, ..., 16 for the rank-1 precoder $F_i$, where H denotes the channel matrix, and for the other ranks, previously computed values are reused.

With regard to codebook 1500, the numbers shown in the column for each rank refer to the column index of the matrices $$W_2 = \frac{1}{\sqrt{8}} H_{3,3,3}(3,3,3,3) \text{ and } W_2 = \frac{1}{\sqrt{8}} H_{3,3,3}(3,3,3,3).$$

Figure 16:
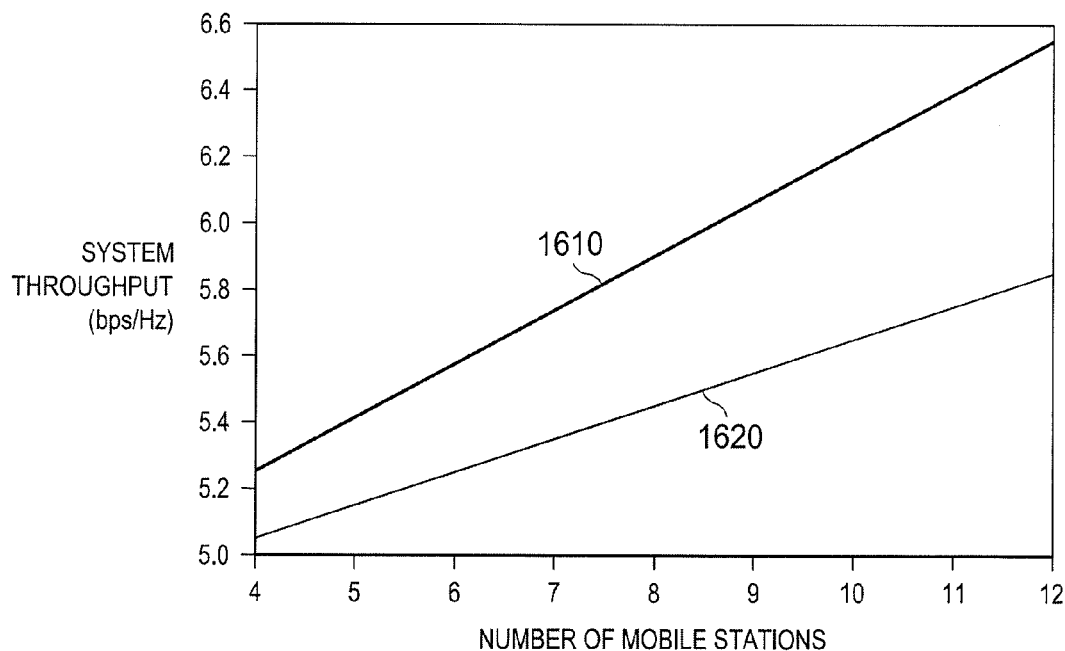
FIG. 16 is a diagram illustrating a system's performance utilizing the codebook of FIGS. 10A and 10B according to an embodiment of this disclosure.

FIG. 16 is a diagram 1600 illustrating a system's performance utilizing codebook 1000 when MU-MIMO is employed at a base station according to an embodiment of this disclosure.

FIG. 16 shows the system throughput of a base station when it communicates with multiple mobile stations throughput the use of MU-MIMO schemes. The system throughput is the average throughput per base station. In this figure, it is assumed that an 8 transmit antenna array is employed at a base station and a 2 receive antenna array is employed at a user terminal. A line 1610 is used to indicate the system throughput using codebook 1000. A line 1620 is used to indicate the system throughput of the prior art method. The results show that the method provided in the present disclosure provides a significant gain over the prior art method.

Figure 17:
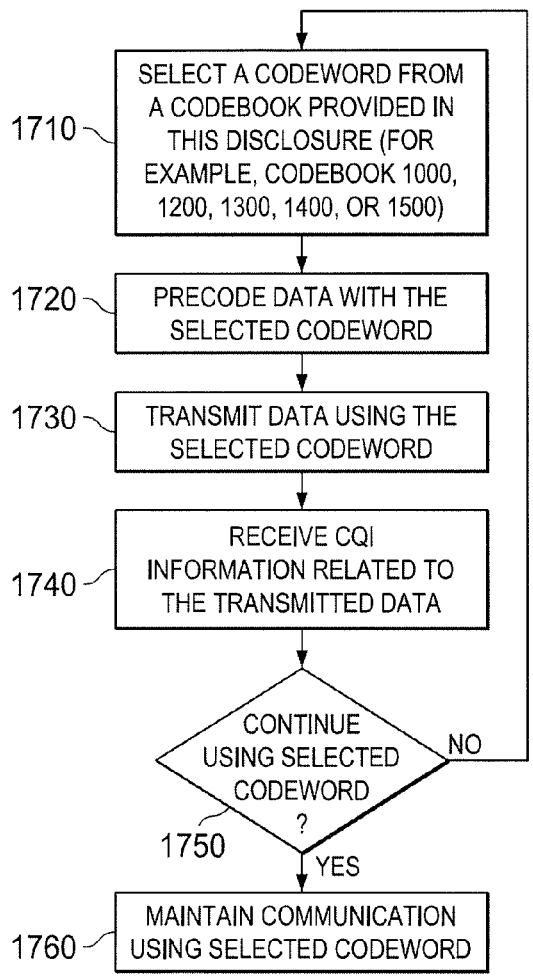
FIG. 17 illustrates a method of operating a base station according to an embodiment of this disclosure.

FIG. 17 illustrates a method 1700 of operating a base station according to an embodiment of this disclosure.

As shown in FIG. 17, a base station selects a codeword from any of the codebooks disclosed in the present disclosure (block 1710). For example, the base station may select a codeword from codebook 1000, 1200, 1300, 1400, or 1500. The base station precodes data with the selected codeword (block 1720) and transmits the data using the selected codeword (block 1730). The base station then receives CQI information related to the transmitted data (block 1740) and determines if the selected codeword is to be used for further data transmission based at least partly upon the received CQI information (block 1750). If the base station decides to use the selected codeword, the base station continues communicating using the selected codeword (block 1760). If the base station decides not to use the selected codeword, the base station selects another codeword from the codebook (block 1710).

In one embodiment, the base station may determine if the selected codeword is to be used for further data transmission by comparing the received CQI information with a pre-determined value. If the received CQI information is equal to or greater than the pre-determined value, the base station uses the selected codeword for further data transmission. If the received CQI information is less than the pre-determined value, the base station does not use the selected codeword for further data transmission and selects another codeword from the codebook. In another embodiment, the base station may transmit data using all of the codewords in the codebook and selects the codeword associated with the best CQI information.

Figure 18:
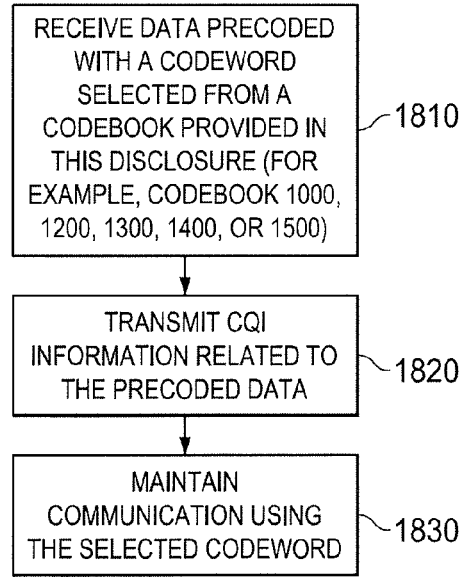
FIG. 18 illustrates a method of operating a mobile or subscriber station according to an embodiment of this disclosure.

FIG. 18 illustrates a method 1800 of operating a mobile or subscriber station according to an embodiment of this disclosure.

As shown in FIG. 18, a subscriber station receives data precoded using a codeword selected from a codebook disclosed in the present disclosure (block 1810). For example, the codeword may be selected from codebook 1000, 1200, 1300, 1400, or 1500. The subscriber station transmits CQI information related to the precoded data (1820). The subscriber station then maintains communication using the selected codeword (1830).

Although the codebooks of this disclosure are described in terms of being 3-bit or 4-bit codebooks, one of ordinary skill in the art would recognize that the codebooks provided in this disclosure may be implemented in codebooks having a larger size without departing from the scope or spirit of this disclosure. Similarly, although the codebooks of this disclosure are described in terms of being used with 8 TX antenna beamforming, one of ordinary skill in the art would recognize that the codebooks provided in this disclosure may be expanded to accommodate beamforming schemes utilizing more than 8 TX antennas without departing from the scope or spirit of this disclosure.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A base station including a multiple antenna array for wireless communication, comprising:
a codebook;
a processor configured to select a codeword from the codebook and to code data with the selected codeword; and
a transmitter configured to transmit the coded data,
wherein codewords in the codebook are based on values shown in the following table:

| | | | | $V8(:, CMI, 3) = [c1, c2, \ldots c8]$; | | | | |
|---|---|---|---|---|---|---|---|---|
| CMI | c1 | c2 | c3 | c4 | c5 | c6 | c7 | c8 |
| 1 | 0.3536 | −0.3051 − 0.1786i | 0.1732 + 0.3082i | 0.0062 − 0.3535i | −0.1839 + 0.3020i | 0.3112 − 0.1677i | −0.3533 − 0.0124i | 0.2987 + 0.1892i |
| 2 | 0.3536 | −0.2514 − 0.2486i | 0.0041 + 0.3535i | 0.2456 − 0.2543i | −0.3535 + 0.0082i | 0.2571 + 0.2427i | −0.0123 − 0.3533i | −0.2397 + 0.2599i |
| 3 | 0.3536 | −0.1697 − 0.3102i | −0.1907 + 0.2977i | 0.3527 + 0.0244i | −0.1479 − 0.3211i | −0.2107 + 0.2839i | 0.3502 + 0.0486i | −0.1254 − 0.3306i |
| 4 | 0.3536 | −0.0614 − 0.3482i | −0.3322 + 0.1210i | 0.1768 + 0.3062i | 0.2708 − 0.2273i | −0.2709 − 0.2272i | −0.1767 + 0.3062i | 0.3323 + 0.1208i |
| 5 | 0.3536 | 0.0638 − 0.3478i | −0.3306 − 0.1254i | −0.1830 + 0.3025i | 0.2646 + 0.2345i | 0.2784 − 0.2180i | −0.1642 − 0.3131i | −0.3376 + 0.1050i |
| 6 | 0.3536 | 0.1881 − 0.2994i | −0.1534 − 0.3185i | −0.3513 − 0.0395i | −0.2204 + 0.2764i | 0.1168 + 0.3337i | 0.3447 + 0.0786i | 0.2499 − 0.2501i |
| 7 | 0.3536 | 0.2892 − 0.2034i | 0.1196 − 0.3327i | −0.0936 − 0.3409i | −0.2727 − 0.2251i | −0.3525 − 0.0272i | −0.3040 + 0.1805i | −0.1449 + 0.3225i |
| 8 | 0.3536 | 0.3461 − 0.0721i | 0.3241 − 0.1412i | 0.2885 − 0.2044i | 0.2407 − 0.2590i | 0.1828 − 0.3026i | 0.1172 − 0.3336i | 0.0467 − 0.3505i |
| 9 | 0.3536 | 0.3461 + 0.0721i | 0.3241 + 0.1412i | 0.2885 + 0.2044i | 0.2407 + 0.2590i | 0.1828 + 0.3026i | 0.1172 + 0.3336i | 0.0467 − 0.3505i |
| 10 | 0.3536 | 0.2892 + 0.2034i | 0.1196 + 0.3327i | −0.0936 + 0.3409i | −0.2727 + 0.2251i | −0.3525 + 0.0272i | −0.3040 − 0.1805i | −0.1449 − 0.3225i |
| 11 | 0.3536 | 0.1881 + 0.2994i | −0.1534 + 0.3185i | −0.513 + 0.0395i | −0.2204 − 0.2764i | 0.1168 + 0.3337i | 0.3447 − 0.0786i | 0.2499 + 0.2501i |
| 12 | 0.3536 | 0.0638 + 0.3478i | −0.3306 + 0.1254i | −0.1830 − 0.3025i | 0.2646 − 0.2345i | 0.2784 + 0.2180i | −0.1642 + 0.3131i | −0.3376 − 0.1050i |
| 13 | 0.3536 | −0.0614 + 0.3482i | −0.3322 − 0.1210i | 0.1768 − 0.3062i | 0.2708 + 0.2273i | −0.2709 + 0.2272i | −0.1767 − 0.3062i | 0.3323 − 0.1208i |

-continued

| | | | V8(:, CMI, 3) = [c1, c2, ... c8]; | | | | | |
|---|---|---|---|---|---|---|---|---|
| CMI | c1 | c2 | c3 | c4 | c5 | c6 | c7 | c8 |
| 14 | 0.3536 | −0.1697 + 0.3102i | −0.1907 − 0.2977i | 0.3527 − 0.0244i | −0.1479 + 0.3211i | −0.2107 − 0.2839i | 0.3502 + 0.0486i | −0.1254 + 0.3306i |
| 15 | 0.3536 | −0.2514 + 0.2486i | 0.0041 − 0.3535i | 0.2456 + 0.2543i | −0.3535 − 0.0082i | 0.2571 − 0.2427i | −0.0123 − 0.3533i | −0.2397 − 0.2599i |
| 16 | 0.3536 | −0.3051 + 0.1786i | 0.1732 − 0.3082i | 0.0062 + 0.3535i | −0.1839 − 0.3020i | 0.3112 + 0.1677i | −0.3533 + 0.0124i | 0.2987 − 0.1892i | where each row represents a Codebook Matrix Index (CMI) and each column (c1~c8) represents an antenna in the multiple antenna array.

2. The base station of claim 1, wherein the values in the table are obtained based on the following equation:

$$V_8(:, k, 3) = \frac{1}{\sqrt{8}} \begin{bmatrix} 1 \\ e^{j\pi \sin(\theta_k)} \\ e^{j2\pi \sin(\theta_k)} \\ e^{j3\pi \sin(\theta_k)} \\ e^{j4\pi \sin(\theta_k)} \\ e^{j5\pi \sin(\theta_k)} \\ e^{j6\pi \sin(\theta_k)} \\ e^{j7\pi \sin(\theta_k)} \end{bmatrix},$$

where $\theta_k$ represents an angle of a beam, k=1, 2, 3, . . . 16 and k represents the CMI.

3. The base station of claim 2, wherein $\theta_k$ is given by the following equation:

$$\theta_k = ((k-1) + 1/2) * \frac{\pi}{24} - \frac{\pi}{3},$$

where k=1, 2, 3, . . . , 16, and k represents the CMI.

4. The base station of claim 1, wherein the codebook is a 4-bit codebook.

5. The base station of claim 1, wherein the table includes real and imaginary values for the second to eighth antennas (c2~c8) of the multiple antenna array for each CMI.

6. A base station including a multiple antenna array for wireless communication, comprising:
a codebook;
a processor configured to select a codeword from the codebook and to code data with the selected codeword; and
a transmitter configured to transmit the coded data,
wherein codewords in the codebook are based on the following equation:

$$V_8(:, k, 3) = \frac{1}{\sqrt{8}} \begin{bmatrix} 1 \\ e^{j\pi \sin(\theta_k)} \\ e^{j2\pi \sin(\theta_k)} \\ e^{j3\pi \sin(\theta_k)} \\ e^{j4\pi \sin(\theta_k)} \\ e^{j5\pi \sin(\theta_k)} \\ e^{j6\pi \sin(\theta_k)} \\ e^{j7\pi \sin(\theta_k)} \end{bmatrix},$$

where $\theta_k$ represents an angle of a beam and k=1, 2, 3, . . . , 16.

7. The base station of claim 6, wherein $\theta_k$ is given by the following equation:

$$\theta_k = ((k-1) + 1/2) * \frac{\pi}{24} - \frac{\pi}{3},$$

where k=1, 2, 3, . . . , 16.

8. The base station of claim 6, wherein the codebook is a 4-bit codebook.

9. The base station of claim 6, wherein the codewords in the codebook account for real and imaginary components of one or more antennas of the multiple antenna array.

10. A method for coding data in a base station including a multiple antenna array for wireless communication, the method comprising:
selecting a codeword from a codebook;
coding data with the selected codeword; and
transmitting the coded data,
wherein codewords in the codebook are based on values shown in the following table:

| | | | V8(:, CMI, 3) = [c1, c2, ... c8]; | | | | | |
|---|---|---|---|---|---|---|---|---|
| CMI | c1 | c2 | c3 | c4 | c5 | c6 | c7 | c8 |
| 1 | 0.3536 | −0.3051 − 0.1786i | 0.1732 + 0.3082i | 0.0062 − 0.3535i | −0.1839 + 0.3020i | 0.3112 − 0.1677i | −0.3533 − 0.0124i | 0.2987 + 0.1892i |
| 2 | 0.3536 | −0.2514 − 0.2486i | 0.0041 + 0.3535i | 0.2456 + 0.2543i | −0.3535 + 0.0082i | 0.2571 + 0.2427i | −0.0123 − 0.3533i | −0.2397 + 0.2599i |
| 3 | 0.3536 | −0.1697 − 0.3102i | −0.1907 + 0.2977i | 0.3527 + 0.0244i | −0.1479 − 0.3211i | −0.2107 + 0.2839i | 0.3502 + 0.0486i | −0.1254 − 0.3306i |
| 4 | 0.3536 | −0.0614 − 0.3482i | −0.3322 + 0.1210i | 0.1768 + 0.3062i | 0.2708 − 0.2273i | −0.2709 − 0.2272i | −0.1767 + 0.3062i | 0.3323 + 0.1208i |
| 5 | 0.3536 | 0.0638 − 0.3478i | −0.3306 − 0.1254i | −0.1830 + 0.3025i | 0.2646 + 0.2345i | 0.2784 − 0.2180i | −0.1642 − 0.3131i | −0.3376 + 0.1050i |

-continued

| | | | V8(:, CMI, 3) = [c1, c2, . . . c8]; | | | | | |
|---|---|---|---|---|---|---|---|---|
| CMI | c1 | c2 | c3 | c4 | c5 | c6 | c7 | c8 |
| 6 | 0.3536 | 0.1881 − 0.2994i | −0.1534 − 0.3185i | −0.3513 − 0.0395i | −0.2204 + 0.2764i | 0.1168 + 0.3337i | 0.3447 + 0.0786i | 0.2499 − 0.2501i |
| 7 | 0.3536 | 0.2892 − 0.2034i | 0.1196 − 0.3327i | −0.0936 − 0.3409i | −0.2727 − 0.2251i | −0.3525 − 0.0272i | −0.3040 + 0.1805i | −0.1449 + 0.3225i |
| 8 | 0.3536 | 0.3461 − 0.0721i | 0.3241 − 0.1412i | 0.2885 − 0.2044i | 0.2407 − 0.2590i | 0.1828 − 0.3026i | 0.1172 − 0.3336i | 0.0467 − 0.3505i |
| 9 | 0.3536 | 0.3461 + 0.0721i | 0.3241 + 0.1412i | 0.2885 + 0.2044i | 0.2407 + 0.2590i | 0.1828 + 0.3026i | 0.1172 + 0.3336i | 0.0467 − 0.3505i |
| 10 | 0.3536 | 0.2892 + 0.2034i | 0.1196 + 0.3327i | −0.0936 + 0.3409i | −0.2727 + 0.2251i | −0.3525 + 0.0272i | −0.3040 − 0.1805i | −0.1449 − 0.3225i |
| 11 | 0.3536 | 0.1881 + 0.2994i | −0.1534 + 0.3185i | −0.3513 + 0.0395i | −0.2204 − 0.2764i | 0.1168 − 0.3337i | 0.3447 − 0.0786i | 0.2499 + 0.2501i |
| 12 | 0.3536 | 0.0638 + 0.3478i | −0.3306 + 0.1254i | −0.1830 − 0.3025i | 0.2646 − 0.2345i | 0.2784 + 0.2180i | −0.1642 + 0.3131i | −0.3376 + 0.1050i |
| 13 | 0.3536 | −0.0614 + 0.3482i | −0.3322 − 0.1210i | 0.1768 − 0.3062i | 0.2708 + 0.2273i | −0.2709 + 0.2272i | −0.1767 − 0.3062i | 0.3323 − 0.1208i |
| 14 | 0.3536 | −0.1697 − 0.3102i | −0.1907 − 0.2977i | 0.3527 − 0.0244i | −0.1479 + 0.3211i | −0.2107 − 0.2839i | 0.3502 − 0.0486i | −0.1254 + 0.3306i |
| 15 | 0.3536 | −0.2514 + 0.2486i | 0.0041 − 0.3535i | 0.2456 + 0.2543i | −0.3535 − 0.0082i | 0.2571 − 0.2427i | −0.0123 + 0.3533i | −0.2397 − 0.2599i |
| 16 | 0.3536 | −0.3051 + 0.1786i | 0.1732 − 0.3082i | 0.0062 + 0.3535i | −0.1839 − 0.3020i | 0.3112 + 0.1677i | −0.3533 + 0.0124i | 0.2987 − 0.1892i | where each row represents a Codebook Matrix Index (CMI) and each column (c1~c8) represents an antenna in the multiple antenna array.

11. The method of claim 10, wherein the values in the table are obtained based on the following equation:

$$V_8(:, k, 3) = \frac{1}{\sqrt{8}} \begin{bmatrix} 1 \\ e^{j\pi sin(\theta_k)} \\ e^{j2\pi sin(\theta_k)} \\ e^{j3\pi sin(\theta_k)} \\ e^{j4\pi sin(\theta_k)} \\ e^{j5\pi sin(\theta_k)} \\ e^{j6\pi sin(\theta_k)} \\ e^{j7\pi sin(\theta_k)} \end{bmatrix},$$

where $\theta_k$ represents an angle of a beam, k=1, 2, 3 . . . 16 and k represents the CMI.

12. The method of claim 11, wherein $\theta_k$ is given by the following equation:

$$\theta_k = ((k-1) + 1/2) * \frac{\pi}{24} - \frac{\pi}{3},$$

where k=1, 2, 3, . . . , 16, and k represents the CMI.

13. The method of claim 12, wherein the codebook is a 4-bit codebook.

14. The method of claim 13, wherein the table includes real and imaginary values for the second to eighth antennas (c2~c8) of the multiple antenna array for each CMI.

15. A method for coding data in a base station including a multiple antenna array for wireless communication, comprising:
selecting a codeword from a codebook;
coding data with the selected codeword; and
transmitting the coded data,
wherein codewords in the codebook are based on the following equation:

$$V_8(:, k, 3) = \frac{1}{\sqrt{8}} \begin{bmatrix} 1 \\ e^{j\pi sin(\theta_k)} \\ e^{j2\pi sin(\theta_k)} \\ e^{j3\pi sin(\theta_k)} \\ e^{j4\pi sin(\theta_k)} \\ e^{j5\pi sin(\theta_k)} \\ e^{j6\pi sin(\theta_k)} \\ e^{j7\pi sin(\theta_k)} \end{bmatrix},$$

where $\theta_k$ resents an angle of a beam and k=1, 2, 3, . . . , 16.

16. The method of claim 15, wherein $\theta_k$ is given by the following equation:

$$\theta_k = ((k-1) + 1/2) * \frac{\pi}{24} - \frac{\pi}{3},$$

where k=1, 2, 3, . . . , 16.

17. The method of claim 15, wherein the codebook is a 4-bit codebook.

18. The method of claim 15, wherein the codewords in the codebook account for real and imaginary components of one or more antennas of the multiple antenna array.

19. A data structure stored on a non-transitory computer readable medium for coding data in a base station including a multiple antenna array for wireless communication, comprising:
a codebook comprising a plurality of codewords configured to be selected by a processor in the base station for coding data,
wherein the codewords in the codebook are based on values shown in the following table:

| CMI | c1 | c2 | c3 | c4 | c5 | c6 | c7 | c8 |
|---|---|---|---|---|---|---|---|---|
| | | | | V8(:, CMI, 3) = [c1, c2, ... c8]; | | | | |
| 1 | 0.3536 | −0.3051 − 0.1786i | 0.1732 + 0.3082i | 0.0062 − 0.3535i | −0.1839 + 0.3020i | 0.3112 − 0.1677i | −0.3533 − 0.0124i | 0.2987 + 0.1892i |
| 2 | 0.3536 | −0.2514 − 0.2486i | 0.0041 + 0.3535i | 0.2456 − 0.2543i | −0.3535 + 0.0082i | 0.2571 + 0.2427i | −0.0123 − 0.3533i | −0.2397 + 0.2599i |
| 3 | 0.3536 | −0.1697 − 0.3102i | −0.1907 + 0.2977i | 0.3527 + 0.0244i | −0.1479 − 0.3211i | −0.2107 + 0.2839i | 0.3502 + 0.0486i | −0.1254 − 0.3306i |
| 4 | 0.3536 | −0.0614 − 0.3482i | −0.3322 + 0.1210i | 0.1768 + 0.3062i | 0.2708 − 0.2273i | −0.2709 − 0.2272i | −0.1767 + 0.3062i | 0.3323 + 0.1208i |
| 5 | 0.3536 | 0.0638 − 0.3478i | −0.3306 − 0.1254i | −0.1830 + 0.3025i | 0.2646 + 0.2345i | 0.2784 − 0.2180i | −0.1642 − 0.3131i | −0.3376 + 0.1050i |
| 6 | 0.3536 | 0.1881 − 0.2994i | −0.1534 − 0.3185i | −0.3513 − 0.0395i | −0.2204 + 0.2764i | 0.1168 + 0.3337i | 0.3447 + 0.0786i | 0.2499 − 0.2501i |
| 7 | 0.3536 | 0.2892 − 0.2034i | 0.1196 − 0.3327i | −0.0936 − 0.3409i | −0.2727 + 0.2251i | −0.3525 − 0.0272i | −0.3040 + 0.1805i | −0.1449 + 0.3225i |
| 8 | 0.3536 | 0.3461 − 0.0721i | 0.3241 − 0.1412i | 0.2885 − 0.2044i | 0.2407 − 0.2590i | 0.1828 − 0.3026i | 0.1172 − 0.3336i | 0.0467 − 0.3505i |
| 9 | 0.3536 | 0.3461 + 0.0721i | 0.3241 + 0.1412i | 0.2885 + 0.2044i | 0.2407 + 0.2590i | 0.1828 + 0.3026i | 0.1172 + 0.3336i | 0.0467 + 0.3505i |
| 10 | 0.3536 | 0.2892 + 0.2034i | 0.1196 + 0.3327i | −0.0936 + 0.3409i | −0.2727 + 0.2251i | −0.3525 + 0.0272i | −0.3040 + 0.1805i | −0.1449 − 0.3225i |
| 11 | 0.3536 | 0.1881 + 0.2994i | −0.1534 + 0.3185i | −0.3513 + 0.0395i | −0.2204 + 0.2764i | 0.1168 + 0.3337i | 0.3447 + 0.0786i | 0.2499 + 0.2501i |
| 12 | 0.3536 | 0.0638 + 0.3478i | −0.3306 + 0.1254i | −0.1830 − 0.3025i | 0.2646 − 0.2345i | 0.2784 + 0.2180i | −0.1642 + 0.3131i | −0.3376 − 0.1050i |
| 13 | 0.3536 | −0.0614 + 0.3482i | −0.3322 − 0.1210i | 0.1768 − 0.3062i | 0.2708 + 0.2273i | −0.2709 + 0.2272i | −0.1767 − 0.3062i | 0.3323 − 0.1208i |
| 14 | 0.3536 | −0.1697 + 0.3102i | −0.1907 − 0.2977i | 0.3527 − 0.0244i | −0.1479 + 0.3211i | −0.2107 − 0.2839i | 0.3502 − 0.0486i | −0.1254 + 0.3306i |
| 15 | 0.3536 | −0.2514 + 0.2486i | 0.0041 − 0.3535i | 0.2456 + 0.2543i | −0.3535 − 0.0082i | 0.2571 − 0.2427i | −0.0123 + 0.3533i | −0.2397 − 0.2599i |
| 16 | 0.3536 | −0.3051 + 0.1786i | 0.1732 − 0.3082i | 0.0062 + 0.3535i | −0.1839 − 0.3020i | 0.3112 + 0.1677i | −0.3533 + 0.0124i | 0.2987 − 0.1892i | where each row represents a Codebook Matrix Index (CMI) and each column (c1~c8) represents an antenna in the multiple antenna array.

20. The data structure of claim 19, wherein the values in the table are obtained based on the following equation:

$$V_8(:, k, 3) = \frac{1}{\sqrt{8}} \begin{bmatrix} 1 \\ e^{j\pi \sin(\theta_k)} \\ e^{j2\pi \sin(\theta_k)} \\ e^{j3\pi \sin(\theta_k)} \\ e^{j4\pi \sin(\theta_k)} \\ e^{j5\pi \sin(\theta_k)} \\ e^{j6\pi \sin(\theta_k)} \\ e^{j7\pi \sin(\theta_k)} \end{bmatrix},$$

where k=1, 2, 3, ..., 16, and k represents the CMI.

21. The data structure of claim 20, wherein $\theta_k$ is given by the following equation:

$$\theta_k = ((k-1) + 1/2) * \frac{\pi}{24} - \frac{\pi}{3},$$

where k=1, 2, 3, ..., 16, and k represents the CMI.

22. The data structure of claim 19, wherein the codebook is a 4-bit codebook.

23. The data structure of claim 19, wherein the table includes real and imaginary values for the second to eighth antennas (c2~c8) of the multiple antenna array for each CMI.

* * * * *